United States Patent [19]
Tobisawa et al.

[11] Patent Number: 5,947,566
[45] Date of Patent: Sep. 7, 1999

[54] BRAKE BOOSTER SYSTEM

[75] Inventors: Yoshio Tobisawa; Yoshiyasu Takasaki, both of Higashimatsuyama, Japan

[73] Assignee: Jidosha Kiki Co., LTD., Tokyo, Japan

[21] Appl. No.: 08/909,846

[22] Filed: Aug. 12, 1997

[30]       Foreign Application Priority Data

Aug. 28, 1996  [JP]  Japan ................................. 8-226675
May 28, 1997  [JP]  Japan ................................. 9-138547

[51] Int. Cl.$^6$ .................................................. B60T 8/44
[52] U.S. Cl. ............................ 303/114.1; 303/116.1; 303/116.2; 303/115.4; 303/117.1
[58] Field of Search ........................... 303/114.1, 113.1, 303/115.1, 115.4, 115.5, 116.1, 117.1, 119.1, 116.2, 11

[56]              References Cited

U.S. PATENT DOCUMENTS 5,002,344  3/1991  Hashida ........................ 303/117.1
5,249,854  10/1993  Yamada ......................... 303/116.1

*Primary Examiner*—Robert J. Oberleitner
*Assistant Examiner*—Mariano Sy
*Attorney, Agent, or Firm*—Kanesaka & Takeuchi

[57]                ABSTRACT

In a brake booster system of the present invention, just after a MCY produces MCY pressure Pi according to the pedal pressure of a brake pedal, a valve piston of a pressure-intensifying valve moves so that a valve portion is seated in a rubber valve seat. In addition, a pedal switch detects the pedaling of the brake pedal to drive a motor and a pressure-intensifying pump. Therefore, W/C pressure Po of a W/C is intensified by the discharge pressure of the pressure-intensifying pump. The intensified W/C pressure Po causes the upward movement of a stepped piston of a pedal stroke shortening cylinder. The brake fluid is transferred toward the MCY corresponding to the movement of the stepped piston, thereby restricting the stroke of the piston of the MCY and thus shortening the pedal stroke of the brake pedal.

11 Claims, 17 Drawing Sheets

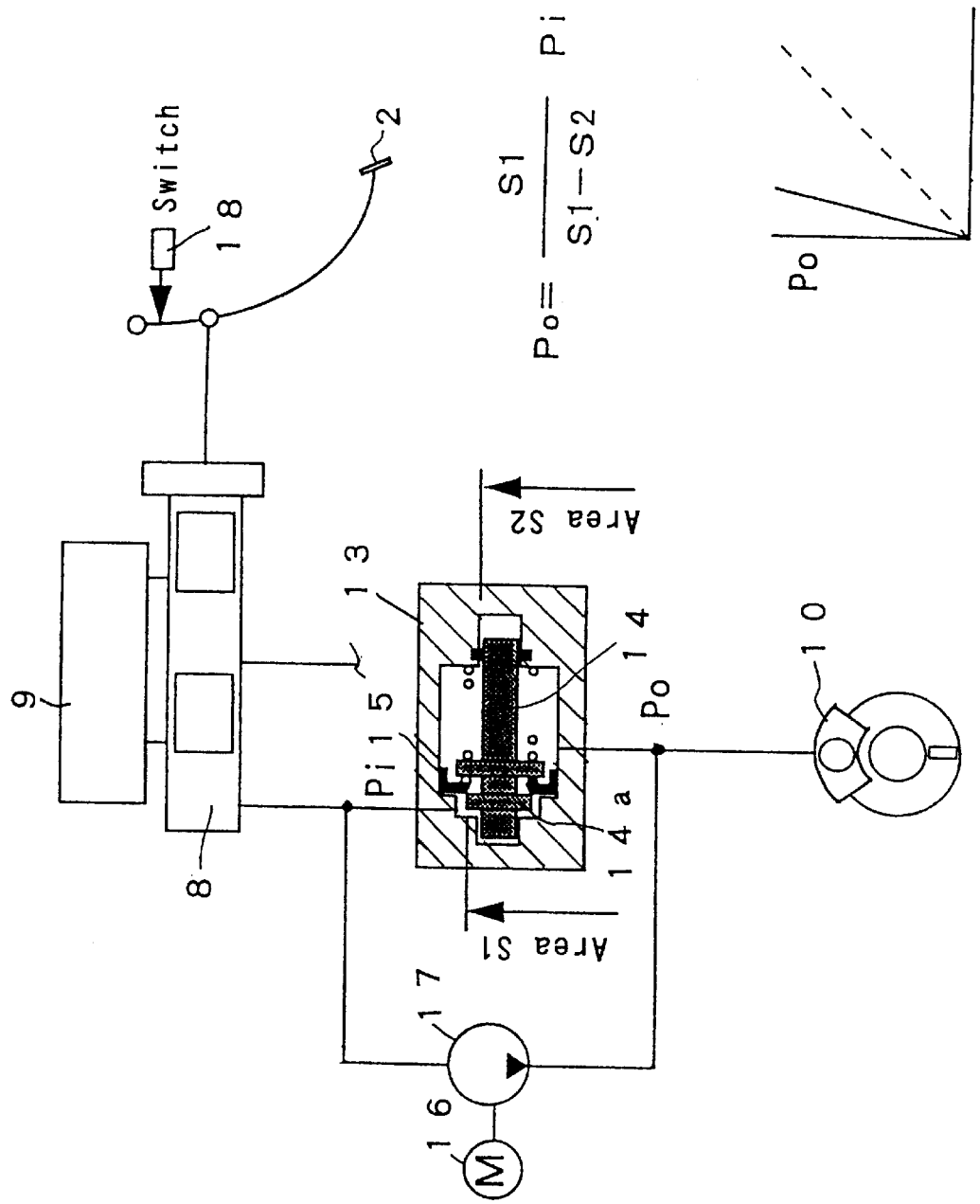

BRAKE BOOSTER SYSTEM

BACKGROUND OF THE INVENTION

The present invention relates to a brake booster system for providing intensified braking forces by boosting brake operating force such as pedal pressure, more particularly to a brake booster system capable of providing intensified braking forces with allowing reduced input stroke of a brake operating member such as a brake pedal.

Conventionally, most vehicles such as automobiles employ a brake booster system, which enables intensified braking forces to be produced by small pedal pressure on a brake pedal, in the brake system thereof. There is a hydraulic booster system, as an example of the conventional brake booster systems, which intensifies pedal pressure by fluid pressure of hydraulic fluid to output intensified forces as shown in FIG. 17. In this figure, numeral 1 designates the hydraulic brake booster system, numeral 2 designates a brake pedal, numeral 3 designates a hydraulic booster, numeral 4 designates a pump, numeral 5 designates a motor M, numeral 6 designates an accumulator, numeral 7 designates a booster reservoir, numeral 8 designates a master cylinder (hereinafter, sometimes referred to as "MCY"), numeral 9 designates a MCY reservoir, and numeral 10 designates each wheel cylinder (hereinafter, sometimes referred to as "W/C").

In such a hydraulic brake booster system 1, the pump 4 is actuated by driving the motor 5 whereby the hydraulic fluid in the booster reservoir 7 is transferred to the hydraulic booster 3 and the accumulator 6 in such a manner that hydraulic fluid in predetermined pressure is conserved in the accumulator 6. In this state, by pedaling the brake pedal 2, a control valve (not shown) of the hydraulic booster 3 is switched so that the pressurized hydraulic fluid in the accumulator 6 is introduced into a power house (not shown) of the hydraulic booster 3 corresponding to the pedal pressure. By the hydraulic fluid introduced into the power house, a power piston (not shown) boosts the pedal pressure to output the intensified force. Then, the piston of the MCY 8 is actuated by the output of the hydraulic booster 3 so that MCY 8 produces MCY pressure Pi which is supplied to the W/Cs 10 as brake fluid pressures to put on the brakes. Since the pedal pressure is intensified by the hydraulic booster 3 at this point, the braking force produced is greater.

There is also a vacuum brake booster system, as another example of the conventional brake booster systems, which intensifies pedal pressure by vacuum to output intensified forces as shown in FIG. 18. In this figure, numeral 11 designates a vacuum brake booster system and numeral 12 designates a vacuum booster.

In such a vacuum brake booster system 11, the vacuum booster 12 is provided with a diaphragm piston (not shown) separating a constant pressure chamber (not shown) in which vacuum is always introduced, from a variable pressure chamber (not shown). By pedaling the brake pedal 2, a switch (not shown) of the vacuum booster 12 is switched so that outside air is introduced into the variable pressure chamber according to the pedal pressure. By the outside air introduced into the variable pressure chamber, the diaphragm piston boosts the pedal pressure to output intensified forces. Then, the piston of the MCY 8 is actuated by the output of the vacuum booster 12 in the same manner so that MCY 8 produces MCY pressure Pi which is supplied to the W/Cs 10 to put on the brakes. Since the pedal pressure is intensified by the vacuum booster 12 at this point, the braking force produced is greater.

By the way, in the hydraulic brake booster system 1 and the vacuum brake booster system 11 as mentioned above, the hydraulic booster 3 and the vacuum booster 12 are relatively large-sized and costly.

One of conceivable systems capable of solving this problem is a brake booster system which intensifies MCY pressure produced by pedal pressure to output intensified braking forces without using such a hydraulic booster 3 or vacuum booster 12, as shown in FIG. 19.

As shown in FIG. 19(a), the brake booster system is provided with a pressure-intensifying valve 13 on a brake pressure line connecting the MCY 8 and the W/C 10. The pressure-intensifying valve 13 comprises a valve piston 14 having a valve portion 14a and a rubber valve seat 15 in which the valve portion 14a can be seated. In this case, the effective receiving area of the valve piston 14 at the MCY 8 side when the valve portion 14a is seated in the valve seat 15 is set to S1 and the non-receiving area of the valve piston 14 is set to S2 in such a manner that the area S1 is greater than the area S2. As the pressure-intensifying valve 13, a proportioning valve (hereinafter, sometimes referred to as "P valve") conventionally used for pressure reducing control of the brake pressure on the rear wheels may be used, with its input/output being reversed, for properly adjusting the distribution of braking forces on the front and rear wheels at MCY pressure exceeding a predetermined values. However, the pressure-intensifying valve 13 is not limited thereto.

The system is also provided with a pressure-intensifying pump 17, which is driven by a motor 16 to supply brake fluid of the MCY 8 to the W/C 10, and a pedal switch 18 for detecting pedaling on the brake pedal 2. The pressure-intensifying pump 17 is disposed on a line in parallel with the line on which the pressure-intensifying valve 13 is disposed in such a manner as to by-pass the pressure-intensifying valve 13.

In the brake booster system, as the pedal switch 18 detects that the brake pedal 2 is pedaled, the motor 16 is actuated to drive the pressure-intensifying pump 17. In addition, as MCY pressure is developed in the MCY 8 by pedaling the brake pedal 2, the valve piston 14 immediately slides so that the valve portion 14a is seated in the rubber valve seat 15. The relation between the MCY pressure Pi at the input of the pressure-intensifying valve 13 and the WIC pressure Po at the output of the pressure-intensifying valve 13 (while Po designates discharge pressure of the pressure-intensifying pump 17 in fact, it also designates W/C pressure when the W/C pressure is equal to the discharge pressure, and as will be described later, the W/C pressure is designated by Pw when the W/C pressure is different from the discharge pressure.) can be given by:

[Expression 1]

$$Po = \{S1/(S1-S2)\}Pi$$

wherein
S1=the receiving area of the valve plunger 14 at the MCY 8 side when the valve portion 14a is seated in the valve seat 15; and
S2=the cross-sectional area of a non-receiving portion 14b of the valve plunger 14.

When the valve portion 14a is seated in the rubber valve seat 15, the W/C pressure Po is intensified by the pressure-intensifying pump 17. When the W/C pressure Po exceeds the pressure Po given by the expression 1, the valve piston 14 is returned so that the valve portion 14a moves away form the rubber valve seat 15. Therefore, the W/C pressure Po escapes to MCY and thus falls. When the W/C pressure Po reaches the pressure Po given by the expression 1 again, the valve piston 14 slides rightward again so that the valve portion 14a is seated in the rubber valve seat 15, thereby offering a balance. In this manner, the W/C pressure Po is intensified to rise relative to the MCY pressure Pi as shown by a solid line in FIG. 19(b) in such a manner as to satisfy the expression 1.

As mentioned above, according to the brake booster system shown in FIG. 19, the MCY pressure produced by the pedal pressure can be intensified without using any booster.

However, in such a brake booster system, when the W/C pressure in the W/Cs 10 is intensified by the pressure-intensifying valve 13 and the pressure-intensifying pump 17, incremental pressure should be supplemented by the brake fluid discharged from the MCY 8, with the result that the stroke of the brake pedal 10 must be increased. That is, since the pedal stroke is defined according to the fluid stiffness of the W/Cs 10 and the like, the pedal stroke can never be shortened.

In also the conventional hydraulic brake booster system 1 and the vacuum brake booster system 11 mentioned above, since the pedal stroke is defined according to the fluid stiffness of the W/Cs 10 and the like in the same manner, there is a problem that the pedal stroke can not shortened.

SUMMARY OF THE INVENTION

The object of the present invention is to provide a brake booster which can intensify brake fluid pressure and still allows input stroke of a brake operating member to be reduced.

For accomplishing the object, the present invention is characterized by comprising: a brake operating member; a master cylinder for producing master cylinder pressure during the brake operating member is operated; at least one brake cylinder for producing braking force when the master cylinder pressure is introduced into the brake cylinder; a pressure-intensifying valve for controlling fluid pressure to render the fluid pressure of the brake cylinder greater than the master cylinder pressure, the pressure-intensifying valve disposed on a brake fluid line between the master cylinder and the brake cylinder; a pressure-intensifying pump which is actuated during the brake operating member is operated to discharge brake fluid within a line between the pressure-intensifying valve and the master cylinder to a line between the pressure-intensifying valve and the brake cylinder, the pressure-intensifying pump disposed on a line arranged in parallel with the line on which the pressure-intensifying valve is disposed; and a stroke shortening means which is actuated by the fluid pressure between the pressure-intensifying valve and the brake cylinder to return the brake fluid to the master cylinder, thereby restricting the input stroke of the brake operating member, the stroke shortening means disposed on a line arranged in parallel with the lines on which the pressure-intensifying valve and the pressure-intensifying pump are disposed respectively.

The present invention is also characterized by comprising: a brake operating member; a master cylinder for producing master cylinder pressure during the brake operating member is operated; at least one brake cylinder for producing braking force when the master cylinder pressure is introduced into the brake cylinder; a pressure-intensifying valve for transferring the master cylinder pressure toward the brake cylinder without controlling fluid pressure until the master cylinder pressure reaches predetermined pressure, and for controlling the fluid pressure to render the fluid pressure of the brake cylinder greater than the master cylinder pressure when the master cylinder pressure exceeds the predetermined pressure, the pressure-intensifying valve disposed on a brake fluid line between the master cylinder and the brake cylinder; a pressure-intensifying pump which is actuated when the master cylinder pressure exceeds the predetermined pressure or when the operating value of the brake operating member exceeds a predetermined value, to discharge brake fluid within a line between the pressure-intensifying valve and the master cylinder to a line between the pressure-intensifying valve and the brake cylinder, the pressure-intensifying pump disposed on a line arranged in parallel with the line on which the pressure-intensifying valve is disposed; and a stroke shortening means which is actuated by the discharge pressure of the pressure-intensifying pump to return the brake fluid to the master cylinder, thereby restricting the input stroke of the brake operating member, the stroke shortening means disposed on a line arranged in parallel with the lines on which the pressure-intensifying valve and the pressure-intensifying pump are disposed respectively.

The present invention is characterized by further comprising a brake booster for intensifying and outputting brake operating force of the brake operating member, wherein the master cylinder is actuated by the output of the brake booster to produce the master cylinder pressure, the pressure-intensifying valve transfers the master cylinder pressure toward the brake cylinder without controlling the fluid pressure until the master cylinder pressure reaches the predetermined pressure which is set in a range exceeding a normal braking range and controls the fluid pressure to render the fluid pressure of the brake cylinder greater than the master cylinder pressure when the master cylinder pressure exceeds the predetermined pressure, and the pressure-intensifying pump is actuated when the master cylinder pressure exceeds the predetermined pressure or when the operating value of the brake operating member exceeds the range exceeding the normal braking range to discharge the brake fluid within the line between the pressure-intensifying valve and the master cylinder to the line between the pressure-intensifying valve and the brake cylinder.

The present invention is still characterized by further comprising a normally open anti-skid control holding valve which is disposed on a brake fluid line between the pressure-intensifying valve and the brake cylinder and capable of cutting off the brake fluid line, a low pressure accumulator to which brake fluid of the brake cylinder is discharged during decompression by anti-skid control, a normally closed anti-skid control pressure-reducing valve which is disposed on a brake fluid line between the brake cylinder and the low pressure accumulator and capable of opening the brake fluid line, and an anti-skid control pump for supplying brake fluid of the low pressure accumulator to the brake fluid line between the pressure-intensifying valve and the anti-skid control holding valve, wherein one common pump functions as both the pressure-intensifying pump and the anti-skid control pump, the suction side of the common pump is connected to the low pressure accumulator during normal operation and anti-skid controlling and is optionally switched to be connected to the master cylinder when the master cylinder pressure exceeds the predetermined pressure or when the operation value of the brake operating member exceeds the predetermined value and anti-skid control is not given.

The present invention is further characterized by that the stroke shortening means comprises a stepped piston and a biasing means for always biasing the stepped piston in a direction opposite to the direction that the brake fluid is returned to the master cylinder, the stepped piston having a large-diameter portion with a receiving surface connected to the master cylinder for receiving the master cylinder pressure, having a discharge pressure receiving surface for receiving discharge pressure of the pressure-intensifying pump, and moving by pressure difference between the discharge pressure and the master cylinder pressure to return brake fluid in a space facing the receiving surface for receiving the master cylinder pressure, and characterized by further comprising a pressure reducing means disposed on a line connecting the discharge side of the pressure-intensifying pump and the discharge pressure receiving surface of the stepped piston, wherein the pressure reducing means is actuated to reduce the discharge pressure when the discharge pressure reaches a second predetermined pressure after starting the pressure intensification by the pressure intensifying valve so that the reduced discharge pressure acts on the discharge pressure receiving surface of the stepped piston.

The present invention is further characterized by that the pressure reducing means is a proportioning valve.

The present invention is still characterized by that the stroke shortening means comprises a stepped piston and a biasing means for always biasing the stepped piston in such a direction as to increase a volume between the master cylinder and the pressure-intensifying valve, the stepped piston having a large-diameter portion with a receiving surface connected to the master cylinder for receiving the master cylinder pressure, having a discharge pressure receiving surface for receiving discharge pressure of the pressure-intensifying pump, and moving by pressure difference between the discharge pressure and the master cylinder pressure to reduce the volume, and characterized by further comprising a stroke control means for determining the stroke of the stepped piston so that the stepped piston moves within the stroke determined by the stroke control means.

The present invention is still yet characterized by that the stroke control means comprises a control piston having an end on which the discharge pressure acts and the other end on which the biasing force of a second biasing means is always exerted.

The present invention is further characterized by that the master cylinder pressure also acts on the other end of the control piston.

The present invention is still further characterized by that the stroke shortening means comprises a stepped piston and a biasing means for always biasing the stepped piston in such a direction of increasing a volume between the master cylinder and the pressure-intensifying valve, the stepped piston having a large-diameter portion with a receiving surface connected to the master cylinder for receiving the master cylinder pressure, having a discharge pressure receiving surface for receiving discharge pressure of the pressure-intensifying pump, and moving by pressure difference between the discharge pressure and the master cylinder pressure to reduce the volume, and characterized by further comprising a pressure reducing means disposed on a line connecting the discharge side of the pressure-intensifying pump and the outlet side of the pressure-intensifying valve, wherein the pressure reducing means is actuated when the discharge pressure reaches a second predetermined pressure to reduce the discharge pressure and introduce it to the outlet side of the pressure-intensifying valve.

The present invention is still yet characterized by that the pressure reducing means is a relief valve which is actuated when the discharge pressure reaches a predetermined relief pressure.

In the brake booster system of the present invention as structured above, the pressure-intensifying valve is actuated by the master cylinder pressure developed by the operation of the brake operating member and the pressure-intensifying pump is also actuated by the operation of the brake operating member. The pressure-intensifying control is given by the operations of the pressure-intensifying valve and the pressure-intensifying pump so as to intensify the brake cylinder pressure. The increase in the brake cylinder pressure renders the stroke shortening means to be actuated to return the brake fluid to the master cylinder, thereby restricting the input stroke of the brake operating member, i.e. reducing the input stroke of the brake operating member.

In the present invention, the pressure-intensifying valve does not start the fluid pressure control until the master cylinder pressure reaches the predetermined pressure so that the pressure-intensifying pump is not actuated. Therefore the pressure intensifying control by the pressure-intensifying valve and the pressure-intensifying pump is therefore not given not to intensify the brake cylinder pressure.

On the other hand, the pressure-intensifying valve starts the fluid pressure control when the master cylinder pressure exceeds the predetermined pressure so that the pressure-intensifying pump is actuated. The brake cylinder pressure is therefore intensified largely by the pressure intensifying control of the pressure-intensifying valve and the pressure-intensifying pump so that the stroke shortening means is actuated, thereby reducing the input stroke of the brake operating means.

Also in the present invention, the pressure-intensifying valve does not start until the master cylinder pressure reaches the predetermined pressure which is set in a range exceeding the normal braking range. The pressure-intensifying pump is also not actuated. Therefore, the pressure intensifying control by the pressure-intensifying valve and the pressure-intensifying pump is not given so that the brake cylinder pressure is intensified only by the boosting action of the booster system.

On the other hand, the pressure-intensifying valve performs the fluid pressure control when the master cylinder pressure exceeds the predetermined pressure. In addition, the pressure-intensifying pump is actuated. The brake fluid pressure is therefore intensified largely by the pressure intensifying control of the pressure-intensifying valve and the pressure-intensifying pump in addition to the boosting action of the booster device. In this manner, the brake fluid pressure can be intensified largely so that the stroke shortening means largely moves, thereby further reducing the input stroke of the brake operating member.

In the present invention, furthermore, the ABS control can be also given in addition to the operation as claimed in claim 3 and one common pump can be used for two purposes as the pressure-intensifying pump and the ABS control pump. The common pump is optionally switched to be connected to the low pressure accumulator during normal operation and anti-skid controlling or to be connected to the master cylinder when the master cylinder pressure exceeds the predetermined pressure or when the operation value of the brake operating member exceeds the predetermined value and anti-skid control is not given. In this manner, one pump is used for two purposes, thereby simplifying the structure of the brake booster system and making the brake booster system at low cost.

In the present invention, moreover, the pressure-reducing means is actuated when the discharge pressure of the pressure-intensifying valve reaches the predetermined pressure after starting the intensification of the pressure-intensifying valve, to reduce the discharge pressure acting on the receiving surface of the stepped piston. Therefore, the increase in the pressure difference acting on the stepped piston can be restricted not to be large. Hence, the increase in the force against the biasing force of the biasing means is also restricted, thereby avoiding the necessity for the biasing means having strong biasing force. This enables the biasing means to be formed in smaller size and thus enables the stroke shortening means to be also formed in smaller size.

Additionally, in the present invention, a P valve conventionally used can be used as the pressure-reducing means of the invention claimed in claimed 5, thereby avoiding the necessity for using exclusive parts for the pressure-reducing means and reducing the cost.

Further, in the present invention, the stroke of the stepped piston is defined by the stroke control means. The stroke of the stepped piston moves within the stroke defined by the stroke control means. That is, the stroke of the stepped piston can be restricted smaller by the stroke control means. By restricting the stroke of the stepped piston, the biasing means for biasing the stepped piston can be formed in smaller size, thereby allowing the stroke shortening means to be formed in smaller size.

In addition, the smaller biasing force of the biasing means of the stepped piston allows the pedal stroke to be reduced just after starting the pressure intensification.

Furthermore, in the present invention, the stroke control means comprises the control piston having one end on which the discharge pressure of the pressure-intensifying pump acts and the other end on which the biasing force of the second biasing means is exerted. Therefore, the structure of the stroke control means can be simplified and the position of the control piston can be controlled further properly because the position is controlled by the relation between the discharge pressure and the biasing force of the second biasing means, thereby stabilizing the characteristics of reduction in the pedal stroke.

Additionally, in the present invention, the master cylinder pressure can act on the other end of the control piston of the invention claimed in claim 8. Since this enables the master cylinder pressure to oppose the discharge pressure, the biasing force of the second biasing means against the discharge pressure can be smaller, thereby making the second biasing means biasing the control piston to be formed in a smaller size and thus making the stroke shortening means to be also formed in a smaller size.

Further, in the present invention, the pressure-reducing means is actuated when the discharge pressure of the pressure-intensifying valve reaches the predetermined pressure after starting the intensification of the pressure-intensifying valve, to reduce the discharge pressure and introduce it to the discharge side of the pressure-intensifying valve. In other words, the discharge pressure can be set to be greater than the output pressure of the pressure-intensifying valve. Therefore, upon starting the intensification by the pressure-intensifying valve, the discharge pressure is increased soon, thereby enabling the stroke shortening means to be actuated while the master cylinder pressure is still small.

Furthermore, in the present invention, the relief valve conventionally used for holding the oil pressure in the oil pressure control circuit at the determined pressure is used as the pressure-reducing means, thereby avoiding the necessity for using exclusive parts for the pressure-reducing means and reducing the cost.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 19 is a view showing one of conceivable brake system which can intensifies brake fluid pressure without using any booster.

DESCRIPTION OF THE PREFERRED EMBODIMENTS

Figure 1:
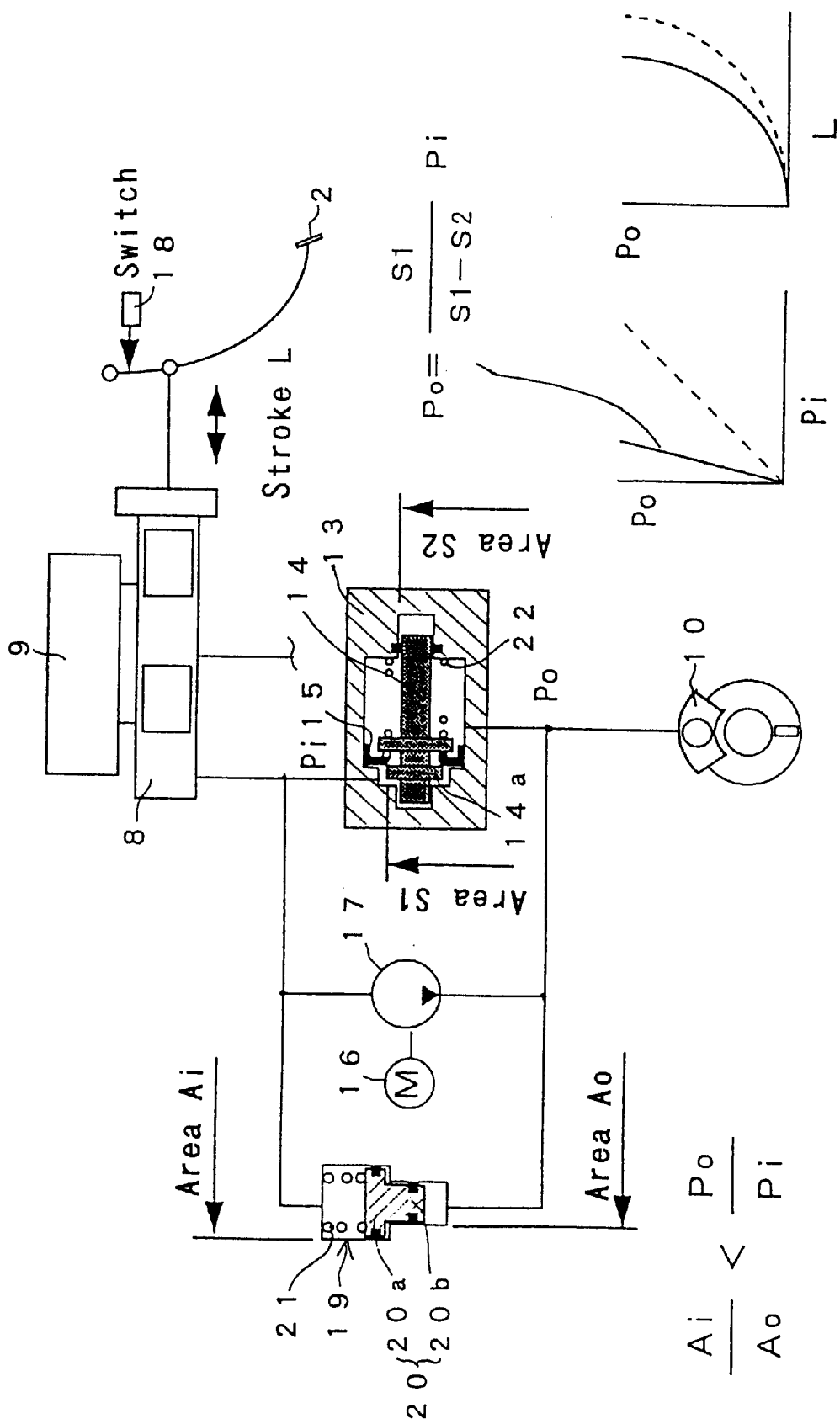
FIG. 1 shows one of embodiments of a brake booster system according to the present invention wherein (a) is a view schematically showing this embodiment, (b) is a diagram for explaining the relation between MCY pressure Pi and WIC pressure Po in this embodiment, and (c) is a diagram for explaining the relation between pedal stroke Li and the W/C pressure Po in this embodiment.

FIG. 1(a) is a view similar to FIG. 19(a) and schematically shows one of embodiments of a brake booster system according to the present invention. It should be noted that parts similar or corresponding to the parts of the brake booster system shown in FIG. 19(a) will be marked by the same reference numerals so that the description about the parts will be omitted.

In the light of the aforementioned brake booster system 1 shown in FIG. 19(a), the brake booster system 1 of this embodiment is further provided with a pedal stroke shortening cylinder 19 arranged on a line in parallel with the lines on which the pressure-intensifying valve 13 and the pressure-intensifying pump 17 are disposed respectively as shown in FIG. 1(a). The pedal stroke shortening cylinder 19 comprises a stepped piston 20 and a spring 21 for always biasing the stepped piston 20 to the W/C 10 way. The stepped piston 20 comprises a large diameter piston 20a, of which an effective receiving area is Ai, for receiving the MCY pressure Pi on one receiving surface of the stepped piston 20 and a small-diameter piston 20b, of which an effective receiving area is Ao, for receiving the W/C pressure Po on the other receiving surface of the stepped piston 20. The effective receiving areas Ai, Ao are set to satisfy the following relation:

[Expression 2]

$$Ai/Ao < Po/Pi.$$

The spring force of the spring 21 is set in such a manner that when the stepped piston 20 moves upward, the stroke of the stepped piston 20 varies at a desired rate corresponding to the rise in the MCY pressure Pi. The other components of the brake booster system 1 of this embodiment are the same as the brake booster system shown in FIG. 19.

In the brake booster system 1 as structured above, the W/C pressure Po is intensified relative to the MCY pressure Pi by the pressure-intensifying valve 13 and the pressure-intensifying pump 17 as shown by a solid line in FIG. 1(b) in the same manner as shown in FIG. 19. At this point, since the effective receiving areas Ai, Ao of the stepped piston 20 are set to satisfy the relation of Expression 2 in the brake booster system of this embodiment, the intensified W/C pressure Po causes the upward movement of the stepped piston 20. The moving range of the stepped piston 20 is determined by having a balance of force from the W/C pressure Po, force from the MCY pressure Pi, and the spring force of the spring 21. The brake fluid is transferred toward the MCY corresponding to the moving range of the stepped piston 20, thereby restricting the stroke of the piston of MCY 8 and thus shortening the pedal stroke of the brake pedal 2. In this case, the relation between the pedal stroke L and the W/C pressure Po pertains to the solid line of FIG. 1(c). As compared to the case of the aforementioned brake booster system shown in FIG. 19 of which the relation is shown by the dotted line of FIG. 1(c), the brake booster system of this embodiment can provide greater W/C pressure Po with smaller pedal stroke.

Figure 2:
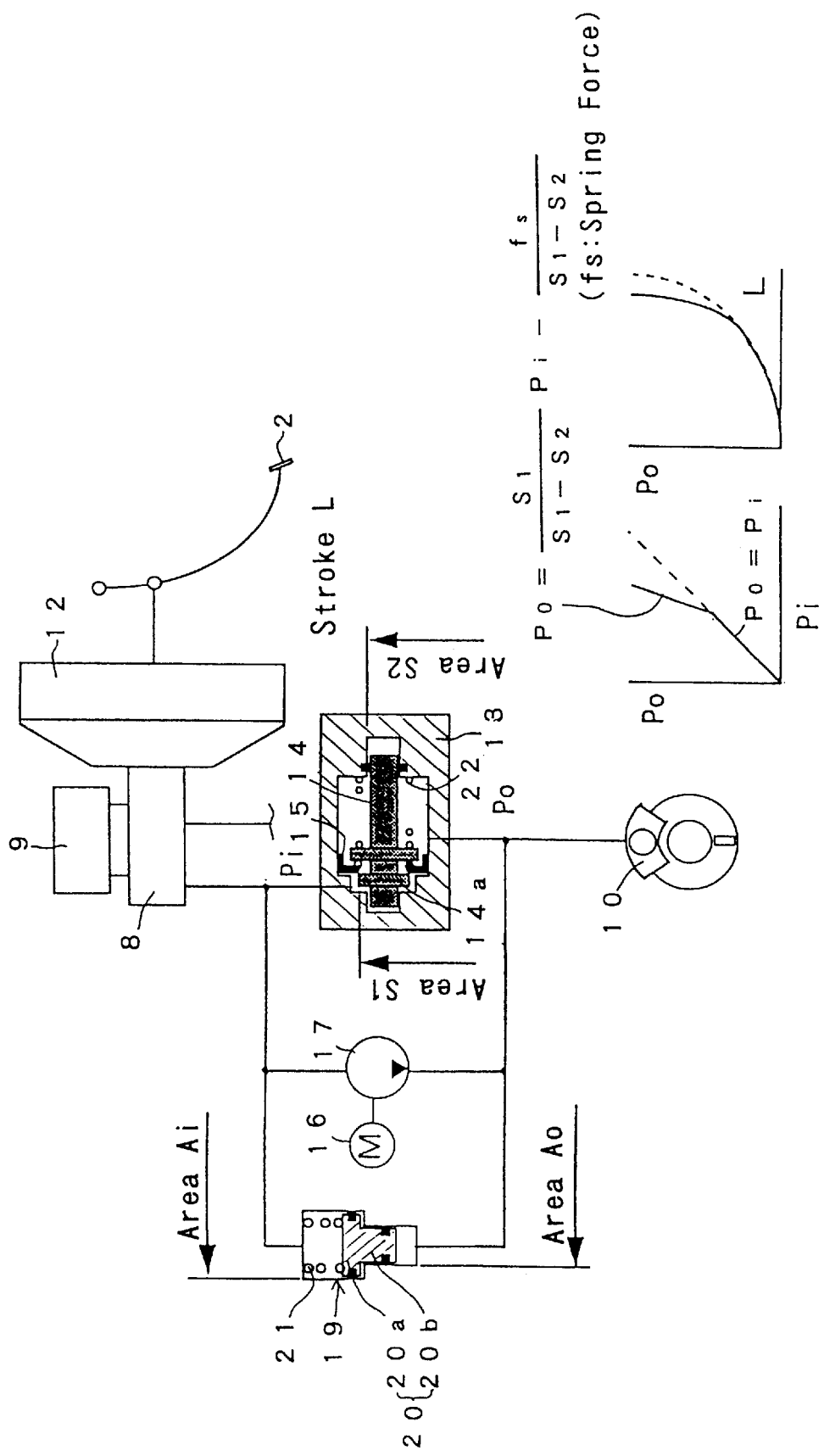
FIG. 2 shows another one of the embodiments according to the present invention wherein (a) is a view schematically showing this embodiment, (b) is a diagram for explaining the relation between MCY pressure Pi and W/C pressure Po in this embodiment, and (c) is a diagram for explaining the relation between pedal stroke Li and the W/C pressure Po in this embodiment.

FIG. 2 is a view similar to FIG. 1, showing another embodiment of the present invention. Parts similar or corresponding to the parts of the aforementioned brake booster system shown in FIG. 1(a) will be marked by the same reference numerals so that the detail description about the parts will be omitted.

As shown in FIG. 2(a), a brake booster system of this embodiment is a combination of the brake booster system of FIG. 1(a) and a vacuum booster 12. The differences from the brake booster system of FIG. 1(a) are as follows.

In the brake booster system of this embodiment, the spring force of the spring 22 biasing the valve piston 14 of the pressure-intensifying valve 13 is set in such a manner as to prevent the valve piston 14 from moving rightward until the MCY pressure reaches a predetermined pressure. The predetermined pressure is set to a value exceeding W/C pressure Po necessary for normal braking (e.g. in a range where the deceleration is less than 0.4G).

In addition, the pressure-intensifying pump 17 is set not to operate in the normal braking range and to operate only in a high G range where the deceleration exceeds the deceleration produced during the normal braking. The high G range is a range where an emergency braking exceeding the normal braking range is given. In this case, in order to detect the MCY pressure Pi, the system is provided with a hydraulic pressure sensor (not shown). When the hydraulic pressure sensor detects that the MCY pressure Pi reaches the predetermined pressure, the pressure-intensifying pump 17 is actuated. Instead of the hydraulic pressure sensor, a pedal pressure sensor for detecting the pedal pressure may be used. In this case, when the pedal pressure sensor detects pedal pressure exceeding a predetermined value which is set based on pedal pressure produced during normal braking, the pressure-intensifying pump 17 is actuated.

The other components of the brake booster system of this embodiment are the same as the brake booster system shown in FIG. 1(a).

In the brake booster system of this embodiment as mentioned above, since the MCY pressure Pi and the pedal pressure are less than the respective predetermined values in the normal braking range, the valve piston 14 of the pressure-intensifying valve 13 does not move and the pressure-intensifying pump 17 is not actuated. Therefore, in the normal braking range, the W/C pressure Po is not intensified by the pressure-intensifying valve 13 and is intensified only by the boosting action of the vacuum booster 12. Accordingly, the MCY pressure Pi and the W/C pressure Po are increased proportionally with each other (Po=Pi) as shown by a line inclined at 45° in FIG. 2(b).

In the high G range exceeding the normal braking range, when either the MCY pressure Pi or the pedal pressure exceeds the predetermined value, the valve piston 14 moves so that the valve portion 14a is seated in the rubber valve seat 15 and the pressure-intensifying pump 17 is actuated. Therefore, the W/C pressure Po is intensified by the boosting action of the pressure-intensifying valve 13 and the pressure-intensifying pump 17 in addition to the boosting action of the vacuum booster 12. As shown in FIG. 2(b), the W/C pressure Po becomes relatively higher as shown by a line inclined at more than 45°. At this point, the W/C pressure Po can be given by:

[Expression 3]

$$Po=(S1/(S1-S2))Pi-F1/(S1-S2)$$

wherein F1 =the setting load of the spring 21. Therefore, emergency braking is securely given whenever the emergency braking in the high G range is operated.

In addition, since the W/C pressure Po becomes greater in this case so that the stepped piston 20 of the pedal stroke shortening cylinder 19 moves relatively largely upward, the pedal stroke L is shortened effectively as shown by the solid line in FIG. 2(c) in comparison to the conventional case shown by the dotted line.

In the brake booster system of this embodiment, further, insufficient pressure with the vacuum booster 12 in the high G range can be supplemented by the pressure-intensifying valve 13 and the pressure-intensifying pump 17, thereby allowing the vacuum booster 12 to be small.

Furthermore, since the pedal stroke can be effectively shortened in the high G range, the brake pedal 2 can be smoothly pedaled even for operating emergency braking. Therefore, even an inexpert driver who can not pedal the brake pedal 2 fully for emergency braking can further securely operate emergency braking.

Instead of the vacuum booster 12, a hydraulic booster 3 may be combined to the pressure-intensifying valve 13 and the pressure-intensifying pump 17.

Figure 3:
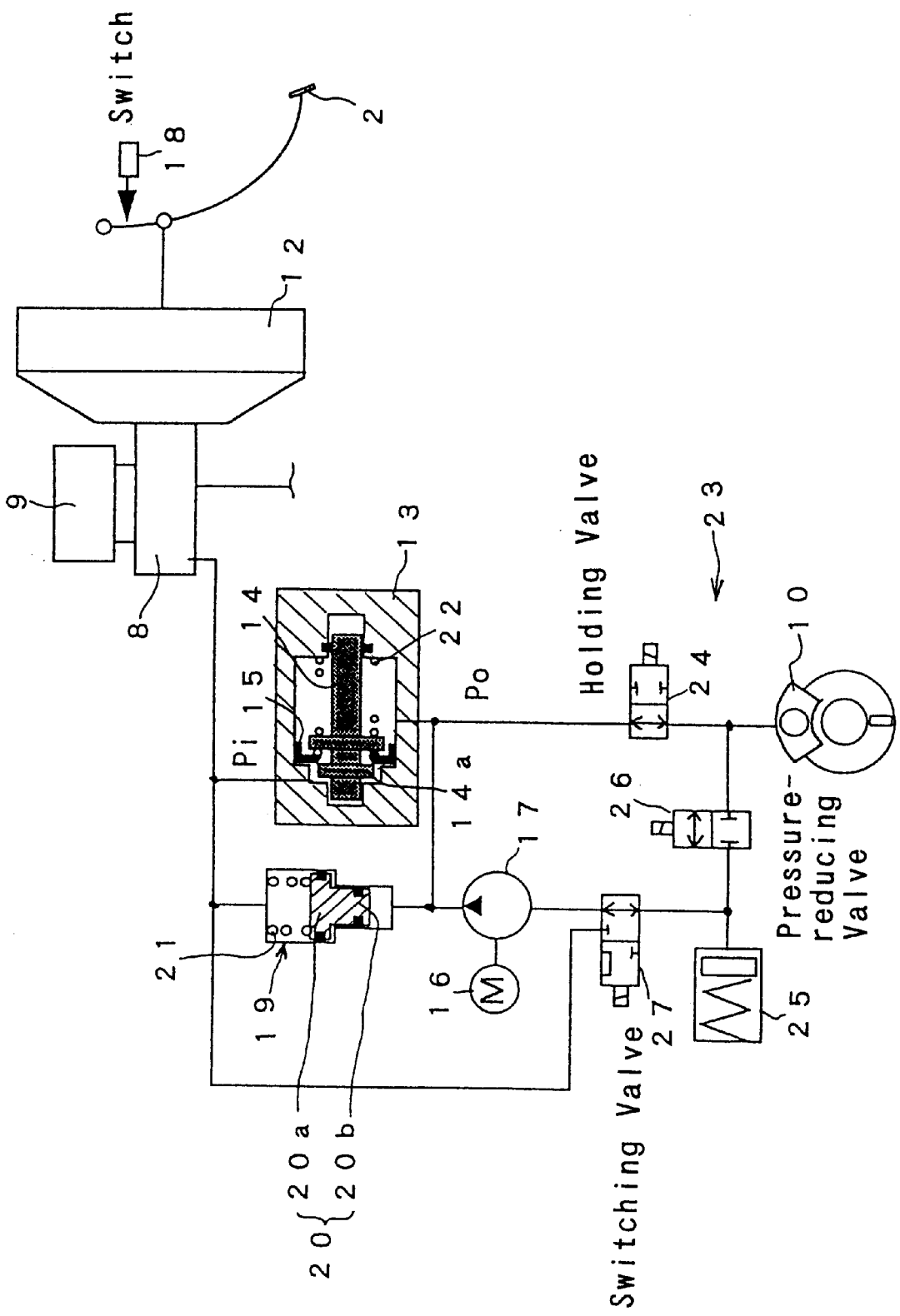
FIG. 3 is a view schematically showing still another one of the embodiments according to the present invention.

FIG. 3 is a view similar to FIG. 2(a), showing still another embodiment of the present invention. Parts similar or corresponding to the parts of the aforementioned brake booster system shown in FIG. 2(a) will be marked by the same reference numerals so that the detail description about the parts will be omitted.

As shown in FIG. 3, the brake booster system is a combination of the brake booster system of FIG. 2(a) and a known anti-skid brake control device (hereinafter, referred to as "ABS control device") 23.

The ABS control device 23 comprises an ABS control holding valve 24 which is a normally open solenoid valve disposed on the way of a brake fluid line connecting the pressure-intensifying valve 13 and the W/C 10, a sump 25 which is a low pressure accumulator to which brake fluid of the W/C 10 is discharged during decompression by ABS control, an ABS control pressure-reducing valve 26 which is normally closed solenoid valve disposed on the way of a brake fluid line between the W/C 10 and the sump 25, and an ABS control pump which is common to the pressure-intensifying pump 17 (in this description, the pressure-intensifying pump 17 will be referred to just as "pump 17" hereinafter) to supply brake fluid of the sump 25 to the brake fluid line between the pressure-intensifying valve 13 and the ABS control holding valve 24.

The system is provided with a switching valve 27 which is a solenoid valve for optionally switching from a case where the pump 17 is used as the ABS control pump to a case where the pump 17 is used as the pressure-intensifying pump or vice versa. The switching valve 27 is set for connecting the pump 17 of the sump 25 in such a manner as to set the pump to be used as the ABS control pump during normal condition and anti-skid control.

The other components of the brake booster system of this embodiment are the same as the brake booster system shown in FIG. 2(a).

In the brake booster system of this embodiment as structured above, when braking is in the normal braking range so that the ABS control is not given, the brake booster system of this embodiment as structured above operates in the same manner as the aforementioned brake booster system shown in FIG. 2(a).

When an electronic control unit (not shown) detects that at least one of the wheels is in locking tendency during normal braking, the ABS control holding valve 24 is set in its interrupting position to hold the brake fluid pressure in the W/C 10 at the brake fluid pressure at this point to prevent the tendency toward wheel lock from glowing. When the electronic control unit detects that at least one of wheels is still in the locking tendency even after holding the brake fluid pressure, the electronic control unit sets the ABS control pressure-reducing valve 26 corresponding to that wheel in its communicating position to discharge the brake fluid of the corresponding W/C 10 to the sump 25 in order to reduce the brake fluid pressure of the W/C 10 and to actuate the pump 17.

Upon reducing the brake fluid pressure, the tendency toward wheel lock is canceled and the rotation of the wheel is restored to some extent. Then, the electronic control unit sets the ABS control pressure-reducing valve 26 in its interrupting position and sets the ABS control holding valve 24 in its communicating position. Therefore, fluid pressure from the pump 17 as well as the MCY fluid pressure is supplied to W/C 10 to increase the brake fluid pressure of the W/C 10 again. In this manner, the electronic control unit controls the ABS control holding valves 24, the ABS control pressure-reducing valves 26, and the pumps 17 so that the ABS control is performed by holding, reducing, and increasing the brake fluid pressures until completely canceling the tendency toward wheel lock.

Additionally, when braking is in the high G range exceeding the normal braking range, the switching valve 27 is switched by the hydraulic sensor or the pedal pressure sensor so that the pump 17 is connected to the MCY 8 and the pump 17 is actuated. At this point, the valve piston 14 of the pressure-intensifying valve 13 moves in such a manner that the valve portion 14a is seated in the rubber valve seat 15. After that, the brake booster system operates in the completely same manner as the aforementioned brake booster system shown in FIG. 2(a).

Moreover, in case where braking is in the high G range and at least one of the wheels is in locking tendency, the ABS control device switches the switching valve 27 to connect the suction side of the pump 17 to the sump 25 so as to give the aforementioned ABS control.

As mentioned above, according to the brake booster system of this embodiment, both the ABS control and the intensifying pressure control can be given by using one pump common to the two purposes, thereby simplifying the structure and reducing the cost.

It should be noted that the brake booster system combined with the ABS control device may be also combined with a traction control device which when a driving wheel is in slipping tendency, brakes the driving wheel to control driving force in such a manner as to cancel the slipping tendency.

Figure 4:
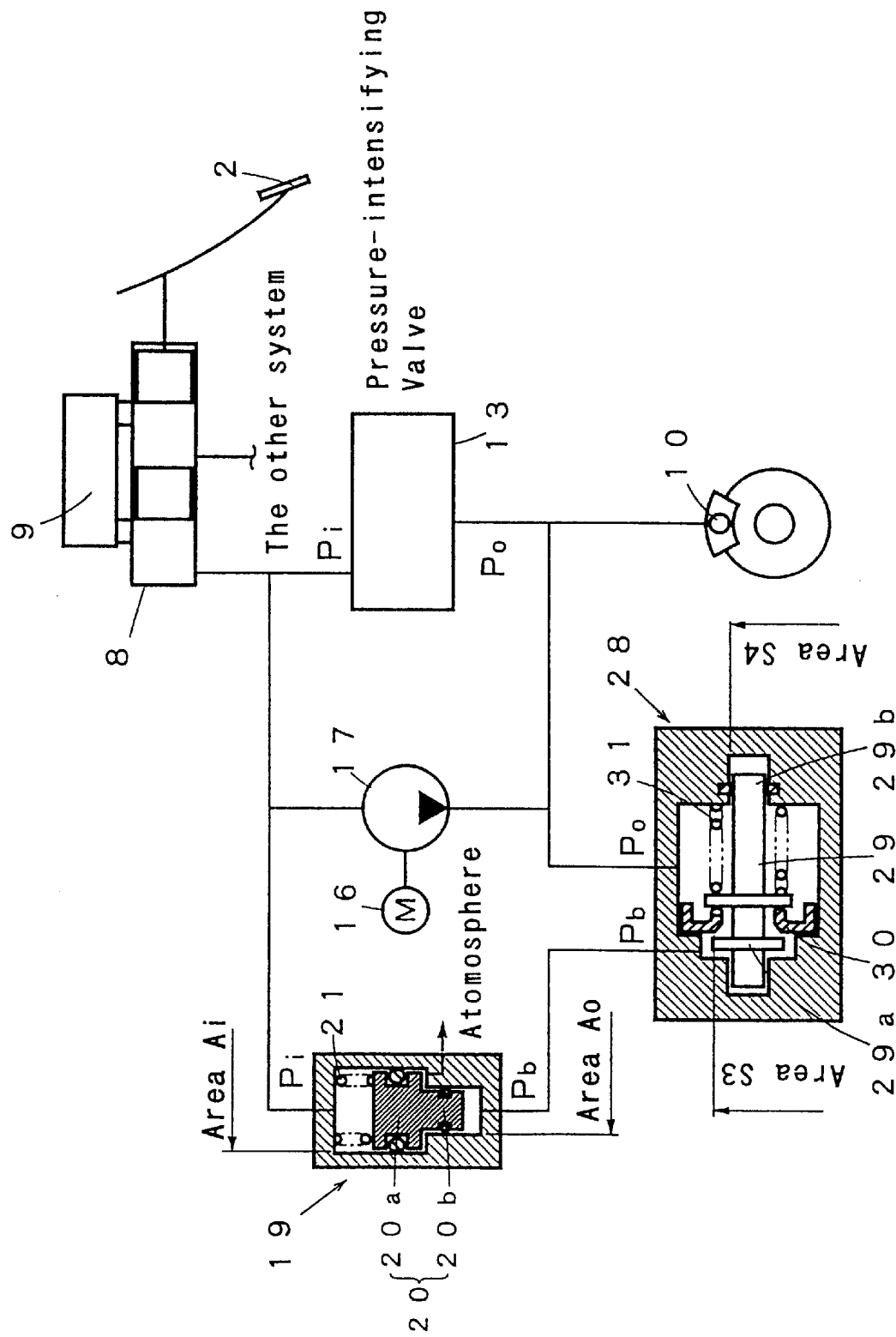
FIG. 4 is a view schematically showing still another one of the embodiments according to the present invention.

FIG. 4 is a view similar to FIG. 2(a), showing still another embodiment of the present invention. Parts similar or corresponding to the parts of the aforementioned brake booster system shown in FIG. 2(a) will be marked by the same reference numerals so that the detail description about the parts will be omitted.

As shown in FIG. 4, a brake booster system of this embodiment is provided with, besides the components of the brake booster system shown in FIG. 2(a), a pressure-reducing valve 28 disposed on the way of a line connecting the discharge side of the pressure-intensifying pump 17 and the pedal stroke shortening cylinder 19 at the small-diameter portion 20b of the stepped piston 20. The pressure-reducing valve 28 comprises a valve piston 29 having a valve portion 29a, a rubber valve seat 30 in which the valve portion 29a can be seated, a valve piston 29, and a spring 31 always biasing the valve portion 29a in such a direction that the valve portion 29a is spaced apart from the rubber valve seat 30. The valve portion 29a side about the valve seat 30 is connected to the small-diameter portion 29b side of the stepped piston 20 and the other side opposite to the valve portion 29a about the valve seat 30 is connected to the discharge side of the pressure-intensifying pump 17.

The effective receiving area of the valve piston 29 at the pedal stroke shortening cylinder 19 side when the valve portion 29a is seated in the valve seat 30 is set to S3 and the sectional area of the non-receiving portion 29b of the valve piston 29 is set to S4. In this case, the area S3 is set to be greater than the area S4. Therefore, the pressure-reducing valve 28 outputs pressure Pb, which is reduced pressure relative to the W/C pressure Po exceeding the predetermined value, to the small-diameter portion 20b of the stepped piston 20.

Figure 5:
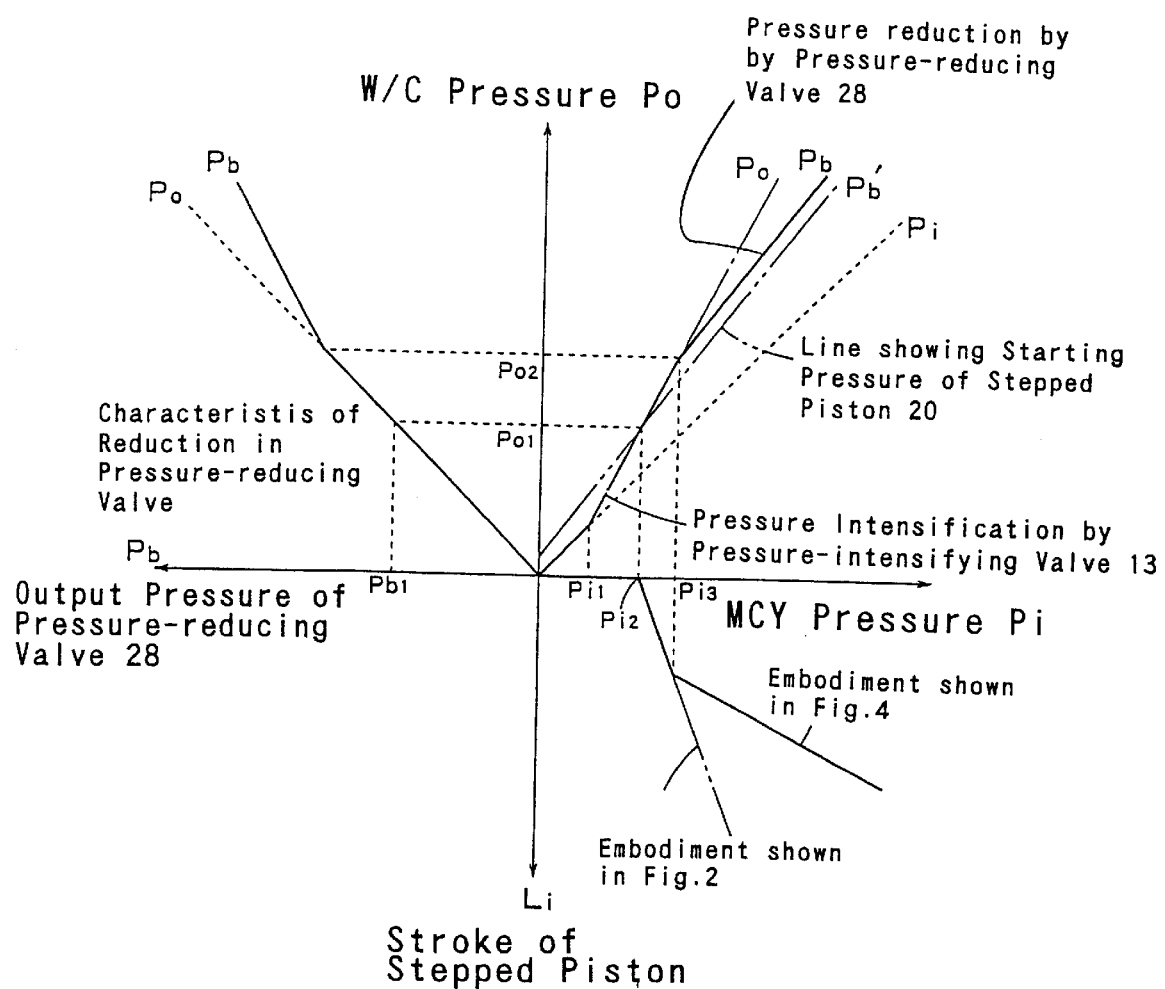
FIG. 5 is a diagram for explaining the relation among MCY pressure Pi, W/C pressure Po, and stroke Li of a stepped piston in the embodiment shown in FIG. 4.

The areas S3, S4 and the set load Fs of the spring 31 of the pressure-reducing valve 28 are set in such a manner that the pressure reduction by the pressure-reducing valve 28 starts after the initiation of the pressure intensification by the pressure-intensifying valve 13 as shown in FIG. 5. Though a P valve conventionally used may be used as the pressure-reducing valve 28, it is not limited thereto. The relation between the W/C pressure Po at the inlet side and the pressure Pb at the discharge side of the pressure-reducing valve 28 can be given by:
[Expression 4]

$$Pb=((S3-S4)/S3)Po+F2/S3$$

wherein
Pb=the output pressure of the pressure-reducing valve 28 during the pressure reduction;
S3=the receiving area of the valve plunger (piston) 29 at the stepped piston 20 side when the valve portion 29a is seated in the valve seat 30;
S4=the sectional area of the non-receiving portion 29b of the valve plunger 29; and
F2=the set load of the spring 31.

Though the brake booster system of the embodiment shown in FIG. 2(a) is provided with the vacuum booster 12, the vacuum booster 12 is omitted from the brake booster system of this embodiment. However, it should be understood that the vacuum booster 12 may be used in this embodiment.

The other components of the brake booster system of this embodiment are the same as the brake booster system shown in FIG. 2(a).

In the brake booster system of this embodiment as structured above, as the MCY pressure Pi becomes Pi,, the pressure-intensifying valve 13 operates and the pressure-intensifying pump 17 also operates at almost the same time in the same manner as the embodiment shown in FIG. 2(a), thereby starting the pressure intensification for intensifying the W/C pressure Po at the outlet side of the pressure intensifying valve 13. At this point, since the pressure-reducing valve 28 does not start the pressure reduction yet, the intensified W/C pressure Po is introduced into the small-diameter portion 20b of the stepped piston 20 directly without being reduced as the output pressure Pb of the pressure-reducing valve 28 and acts on the small-diameter portion 20b. However, since the W/C pressure Po is lower than the pressure at which the stepped piston is moved, the stepped piston 20 does not move even when the MCY pressure Pi rises as shown in the fourth quadrant of FIG. 5.

The W/C pressure Po reaches the stroke starting pressure Po, of the stepped piston 20 (the MCY pressure $Pi_2$ at this point), the stepped piston 20 starts to move as shown in the fourth quadrant of FIG. 5. Since the W/C pressure Po acts on the stepped piston 20 without being reduced, the stepped piston 20 moves largely (greater inclination) relative to the rise of the MCY pressure Pi. The stroke starting pressure $Po_1$ of the stepped piston 20 can be given by:
[Expression 5]

$$Po_1=(Ai/Ao)Pi+F3/Ao$$

wherein
Ai=the receiving area of the large-diameter portion 20a of the stepped piston 20;
Ao=the receiving area of the small-diameter portion 20b of the stepped piston 20; and
F3=the set load of the spring 21.

In addition, the inclination ($\Delta Li/\Delta Pi$) of variation $\Delta Li$ in the stroke Li of the stepped piston 20 relative to variation $\Delta Pi$ in the MCY pressure Pi at this point can be given by:
[Expression 6]

$$\Delta Li/\Delta Pi=(\Delta Po\cdot Ao-\Delta Pi\cdot Ai)/(K\cdot \Delta Pi)$$

wherein K=the spring constant of the spring 21.

As the W/C pressure Po rises and reaches the pressure-reduction starting pressure $Po_2$ of the pressure-reducing valve 28, the pressure-reducing valve 28 operates to output the pressure Pb which is reduced W/C pressure Po so that the pressure Pb lower than the W/C pressure Po acts on the stepped piston 20. Therefore, the stepped piston 20 moves smaller (smaller inclination) relative to the rise of the MCY pressure Pi. The inclination ($\Delta Li/\Delta Pi$) of variation $\Delta Li$ in the stroke Li of the stepped piston 20 relative to variation $\Delta Pi$ in the MCY pressure Pi at this point can be given by:
[Expression 7]

$$\Delta Li/\Delta Pi = (\Delta Pb\cdot Ao-\Delta Pi\cdot Ai)/(K\cdot \Delta Pi).$$

In the brake booster system of this embodiment, the pressure Pb introduced into the small-diameter portion 20b of the stepped piston 20 varies along the same inclination as the MCY pressure Pi until the MCY pressure Pi reaches the value $Pi_1$ because the pressure is neither intensified nor reduced, varies along a larger inclination as compared to the MCY pressure Pi when the MCY pressure Pi is in a range between the value $Pi_1$ and the value $Pi_2$ because the pressure is intensified by the pressure-intensifying valve 13, and varies along a smaller inclination (substantially the same inclination as the line of the starting pressure of the stepped piston 20) as compared to the MCY pressure Pi when the MCY pressure Pi exceeds the value $Pi_2$ because the pressure is intensified by the pressure-intensifying valve 13 and reduced by the pressure-reducing valve 28 simultaneously.

By the way, in the brake booster system of the embodiment shown in FIG. 2(a), as the pressure-intensifying valve 13 operates, the W/C pressure Po is intensified and directly acts on the stepped piston 20, thereby increasing the pressure difference between the W/C pressure Po and the MCY pressure Pi, which act on the both ends of the stepped piston 20, respectively. Therefore, the force of the stepped piston 20 in the upward direction of this figure produced by the pressure difference is increased so that it is necessary that the increased force is opposed by the spring 21. Accordingly, the spring 21 must have strong force. This increases the size of the spring 21 and thus increases the size of the device. On the other hand, in the brake booster system of this embodiment, even when the pressure-intensifying valve 13 operates to intensify the W/C pressure Po, as the W/C pressure Po reaches the predetermined value, the pressure-reducing valve 28 operates to reduce the W/C pressure Po to output the pressure Pb so that the reduced pressure Pb acts on the stepped piston 20, thereby restricting the increase of the pressure difference between the pressure Pb and the MCY pressure Pi which act on the both ends of the stepped piston 20, respectively. The pressure difference is therefore never increased just as the embodiment shown in FIG. 2(a). The upward force of the stepped piston 20 produced by the pressure difference is not also increased, thereby avoiding the necessity for providing the spring with such strong force. This allows the size of the spring 21 to be smaller and thus allows the size of the device to be smaller.

To explain theoretically, the inclination ($\Delta Li/\Delta Pi$) of variation $\Delta Li$ in the stroke Li of the stepped piston 20 relative to the variation $\Delta Pi$ in the MCY pressure Pi can be given by the same expression as the aforementioned expression 6 for a period before starting the pressure reduction of the pressure-reducing valve 28 of this embodiment. As a result that the comparison is made between the expression 6 and the aforementioned expression 7 for a period during the pressure reduction of the pressure-reducing valve 28, there is only one difference between them that "Po" in the expression 6 is replaced by "Pb" in the expression 7. Since Pb is the output pressure by the pressure reduction of the pressure-reducing valve 28 and Po is the pressure which is not reduced by the pressure-reducing valve 28, i.e. ΔPb<ΔPo, the spring constant K in the expression 7 can be set smaller than the spring constant K in the expression 6 in order to obtain the same value of the stroke inclination (ΔLi/ΔPi) by both expressions. That is, the spring 21 acting on the stepped piston 20 in this embodiment can be smaller than the spring 21 of the embodiment shown in FIG. 2(a).

Using a P valve, which is conventionally used for controlling the distribution of the brake pressures on the front and rear wheels, as the pressure-reducing valve 28 can avoid the necessity for using an exclusive valve as the pressure-reducing valve 28 and thus can reduce the cost.

The operation and effects of this embodiment are the same as the embodiment shown in FIG. 2(a) besides the effect of the vacuum booster 12.

Figure 6:
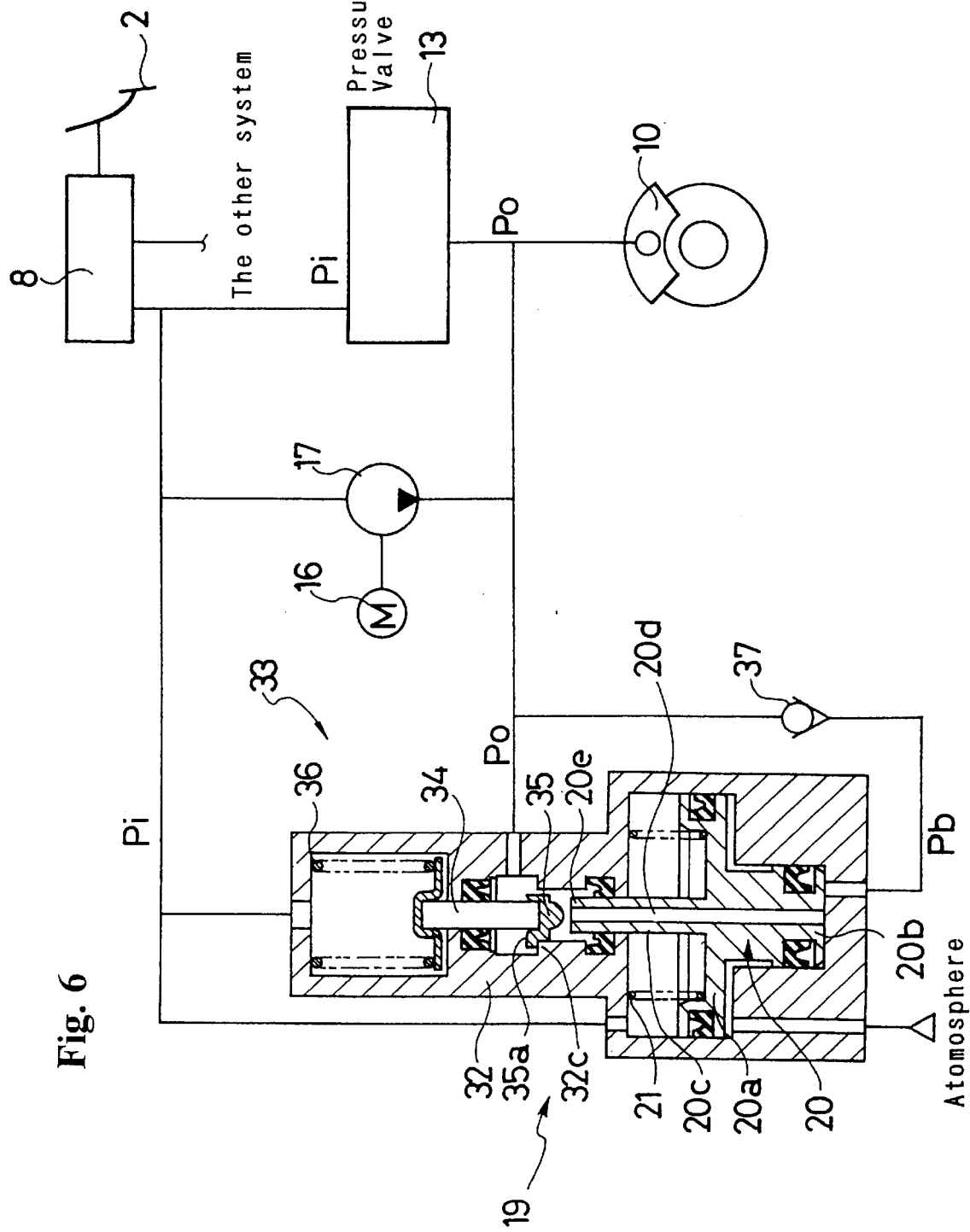
FIG. 6 is a view schematically showing still another one of the embodiments according to the present invention.

FIG. 6 is a view similar to FIG. 2(a), showing still another embodiment of the present invention. Parts similar or corresponding to the parts of the aforementioned brake booster system shown in FIG. 2(a) will be marked by the same reference numerals so that the detail description about the parts will be omitted.

Figure 7:
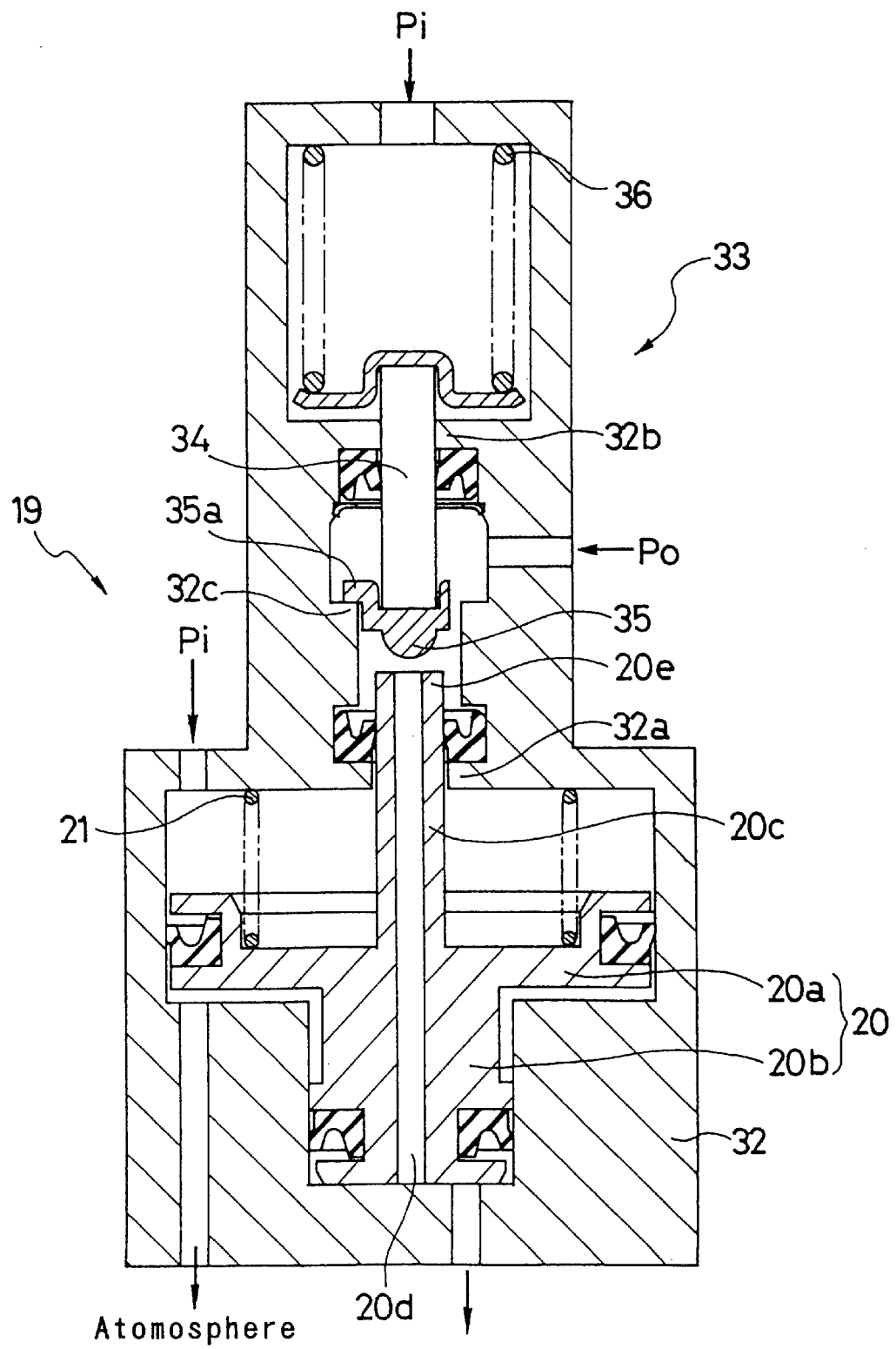
FIG. 7 is an enlarged sectional view of a control valve used in the embodiments shown in FIG. 6 and FIG. 12.

As shown in FIGS. 6 and 7, the brake booster system of this embodiment is provided with a projecting shaft 20c projecting in the axial direction from the center of the large-diameter portion 20a of the stepped piston 20 of the pedal stroke shortening cylinder 19 of FIG. 2(a). The projecting shaft 20c sealingly and slidably penetrates a first partition 32a of a housing 32. Formed in the center of the stepped piston 20 is a hole 20d extending from the end of the small-diameter portion 20b to the end of the projecting shaft 20c in the axial direction. The projecting shaft 20c is provided with a valve seat 20e formed around the open end of the hole 20d.

The pedal stroke shortening cylinder 19 is also provided with a stroke control means 33 in addition to the stepped piston 20. The stroke control means 33 comprises a control piston 34, a valve body 35 which is disposed on one end (the lower end in this drawing) of the control piston 34 and which can be seated in the valve seat 20e, and a spring 36 always biasing the control piston 34 in such a direction that the valve body 35 is seated in the valve seat 20e. The control piston 34 sealingly and slidably penetrates a second partition 32b of the housing 32 in such a manner that the W/C pressure Po acts on a side of the valve body 35 of the stroke control means 33 and the MCY pressure Pi acts on the an end where is biased by the spring 36 of the stroke control means 33. The valve body 35 is provided with a stopper 35a which comes into contact with a step 32c of the housing 32 to prevent the control piston 34 and valve body 35 from further moving in the lower direction.

The W/C pressure Po is introduced toward the small-diameter portion 20b of the stepped piston 20 from the projecting shaft 20c side through the hole 20d of the stepped piston 20 so that the W/C pressure Po can act on the end of the small-diameter portion 20b. At the small-diameter portion 20b side, the pedal stroke shortening cylinder 19 is connected to the pressure-intensifying valve 13 through a check valve 37. The check valve 37 allows only the flow of the brake fluid in the direction from the small-diameter portion 20b toward the pressure-intensifying valve 13. When the W/C pressure Po falls after movement of the stepped piston 20, the check valve 37 opens to discharge the brake fluid, introduced into a space facing the end of the small-diameter portion 20b, toward the pressure-intensifying valve 13 so that the stepped piston 20 can smoothly return to a non-operating position as shown in the drawing.

The other components of the brake booster system of this embodiment are the same as the brake booster system shown in FIG. 2(a).

In the brake booster system of this embodiment as structured above, when the brake system is in non-operation, the pedal stroke shortening cylinder 19 is in the illustrated state, the stepped piston 20 is in the non-operating position in which the end of the small-diameter portion 20b is in contact with the bottom of the cylinder hole of the housing 32, and the control piston 34 is in the non-operating position in which the stopper 35a of the valve body 35 is in contact with the step 32c of the housing 32. In this state, the valve body 35 is positioned away from the valve seat 20e and the connection between the outlet side of the pressure-intensifying valve 13 and the small diameter portion 20b side of the pedal stroke shortening cylinder 19 is allowed.

As the brakes are applied from this state, the MCY pressure Pi acts on the receiving surface of the large-diameter portion 20a and the W/C pressure Po acts on the receiving surface of the small-diameter portion 20b. However, before starting the pressure intensification by the pressure-intensifying valve 13, the MCY pressure Pi and the W/C pressure Po are equal to each other so as not to produce pressure difference therebetween. Therefore, neither the stepped piston 20 nor the control piston 34 moves upward.

When a predetermined pressure difference is developed between the W/C pressure Po and the MCY pressure Pi after starting the pressure intensification by the pressure-intensifying valve 13 from this state, the control piston 34 moves upward against the spring force of the spring 36 and stops in a position where the force exerted on the control piston 34 and the spring force of the spring 36 are in balance. On the other hand, like the aforementioned embodiments, the stepped piston 20 moves upward by the pressure difference between the W/C pressure Po and the MCY pressure Pi so that the valve seat 20e comes in contact with the valve body 35. The upward movement of the stepped piston 20 closes the opening of the hole 20d at the projecting shaft 20c side so as to interrupt the communication between the space facing the end of the small-diameter portion 20b and the pressure-intensifying valve 13 through the hole 20d. Therefore, the W/C pressure Po is no longer introduced into the space facing the end of the small-diameter portion 20b so that the stepped piston 20 stops in this position.

After the pressure intensification, the pressure-intensifying valve 13 makes the MCY pressure Pi and the W/C pressure Po equal so that there is no pressure difference between them. Therefore, the stepped piston 20 moves downward by the spring force of the spring 21 and the control piston 34 also moves downward by the spring force of the spring 36. At this point, the brake fluid introduced into the space facing the end of the small-diameter portion 20d flows toward the pressure-intensifying valve 13 through the check valve 37. Then, the stopper 35a of the valve body 35 comes into contact with the step 32c so that the control piston 34 is stopped from moving downward, and the small-diameter portion 20b comes into contact with the bottom of the cylinder hole so that the stepped piston 20 is stopped from moving downward with the result that the pedal stroke shortening cylinder 19 is in the position shown in FIG. 6.

In this way, corresponding to the pressure difference between the W/C pressure Po and the MCY pressure Pi, the control piston 34 defines the stroke of the stepped piston 20 and controls the movement of the stepped piston 20 in the defined stroke. The suitable setting of the sectional area of the control piston 34 and the spring constant of the spring 36 enables the stroke of the stepped piston 20, which is controlled by the control piston 34, to be restricted smaller. That is, the stroke of the stepped piston 20 can be reduced as compared to the embodiment shown in FIG. 2(*a*). In this case, the control piston 34 need not be provided with a function for reducing the volume at the MCY side. Therefore, the control piston 34 having smaller sectional area is enough and the spring 36 having smaller spring constant is enough, thereby enabling the stroke control means 33 to be formed in a smaller size.

Since the stroke of the stepped piston 20 is defined by the control piston 34 as mentioned above, the spring 21 which defines the stroke of the stepped piston 20 in the aforementioned embodiments can be replaced with a smaller one. Therefore, the pedal stroke shortening cylinder 19 can be formed in a smaller size as a whole. Furthermore, since the spring 21 having smaller spring constant may be employed, the stepped piston 20 can be moved while the pressure difference between the W/C pressure Po and the MCY pressure Pi is still relatively small, thereby reducing the pedal stroke just after the initiation of the pressure intensification.

Figure 8:
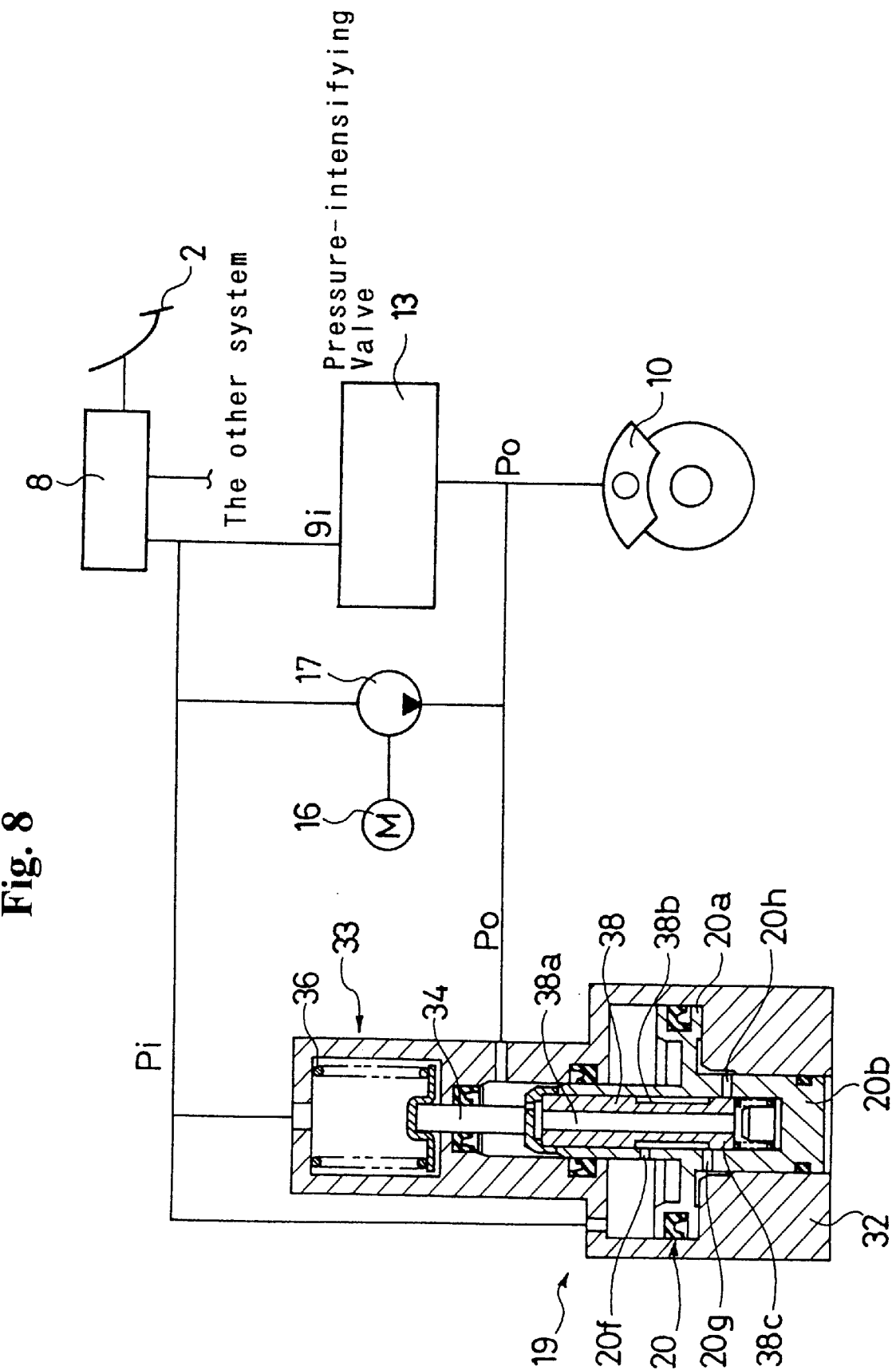
FIG. 8 is a view schematically showing still another one of the embodiments according to the present invention.

FIG. 8 is a view similar to FIG. 6, showing still another embodiment of the present invention. Parts similar or corresponding to the parts of the aforementioned brake booster system shown in FIG. 6 will be marked by the same reference numerals so that the detail description about the parts will be omitted.

While the W/C pressure Po as the output of the pressure-intensifying valve 13 acts on the end face of the small-diameter portion 20*b* of the stepped piston 20 in the aforementioned embodiment shown in FIG. 6, the W/C pressure Po acts on a surface, facing the small-diameter portion 20*b*, of the large-diameter portion 20*a* of the stepped piston 20 in a brake booster system of this embodiment as shown in FIG. 8. In addition, while the valve body 35 and the valve seat 20*e* together control the supply and discharge of the brake fluid at the W/C pressure Po to the end face of the small-diameter portion 20*b* in the embodiment shown in FIG. 6, they together control the supply and discharge of the brake fluid at the W/C pressure Po to the surface, facing the small-diameter portion 20*b*, of the large-diameter portion 20*a* in this embodiment.

To explain concretely, the projecting shaft 20*c* of the stepped piston 20 has a first radial hole 20*f* for allowing the communication between the hole 20*d* and a receiving surface 20*i*, facing the projecting shaft 20*c*, of the large-diameter portion 20*a*, and a second radial hole 20*g* and a third radial hole 20*h* each of which allows the communication between the hole 20*d* and a receiving surface 20*j*, facing the small-diameter portion 20*b*, of the large-diameter portion 20*a*. Slidably inserted into the hole 20*d* (in this embodiment, the hole 20*d* does not penetrate the small-diameter portion 20*b*) is a spool valve 38 having a through hole 38*a* in the center thereof extending in the axial direction. The spool valve 38 is provided with a circular groove 38*b* formed in the outer surface thereof for allowing the communication between the first radial hole 20*f* and the second radial holes 20*g*, and a valve portion 38*c* for controlling the communication and interruption between the second radial hole 20*g* and the groove 38*b* and for controlling the communication and interruption between the third radial hole 20*h* and the through hole 38*a*.

The spool valve 38 is connected to the control piston 34 through the connecting member 39. The lower end of the connecting member 39 is able to come in contact with the upper end of the projecting shaft 20*c* of the stepped piston 20. During the brake system is in non-operation, the connecting member 39 comes into contact with the projecting shaft 20*c* so that the stepped piston 20 is held in the illustrated non-operating position by the spring force of the spring 36. In the state where the brake system is in non-operation, the valve portion 38*c* allows the communication between the first radial hole 20*f* and the second radial hole 20*g* through the groove 38*b* and the valve portion 38*c* interrupts the communication between the third radial hole 20*h* and the through hole 38*a*.

The other components of the brake booster system of this embodiment are the same as the brake booster system shown in FIG. 6 except that the spring 21 biasing the stepped piston 20, the check valve 37, and the line on which the check valve 37 is disposed are omitted.

In the brake booster system of this embodiment as structured above, during the brake system is in non-operation, the pedal stroke shortening cylinder 19 is in the illustrated state and the stepped piston 20 is in the non-operating position by the spring force of the spring 36 where the surface, facing the small-diameter portion 20*b*, of the large-diameter portion 20*a* is in contact with the step of the cylinder hole of the housing 32. In this state, the spool valve 38 is in a position where the valve portion 38*c* allows the communication between the second radial hole 20*g* and the groove 38*b* and interrupts the communication between the third radial hole 20*h* and the through hole 38*a*. Therefore, the receiving surfaces 20*i* and 20*j* of the large-diameter portion 20*a* communicate with each other and the receiving surface 20*j* does not communicate with the output of the pressure-intensifying valve 13.

As the brakes are applied from this state, the MCY pressure Pi acts directly on the receiving surface 20*i* and also acts on the receiving surface 20*j* through the first radial hole 20*f*, the groove 38*b*, and the second radial hole 20*g*. However, since the receiving area of the receiving surface 20*i* is greater than the receiving area of the receiving surface 20*j*, the stepped piston 20 does not move upward. Before starting the pressure intensification by the pressure-intensifying valve 13, the MCY pressure Pi and the W/C pressure Po are equal to each other so as not to produce pressure difference therebetween so that the control piston 34 does not move upward.

Figure 10:
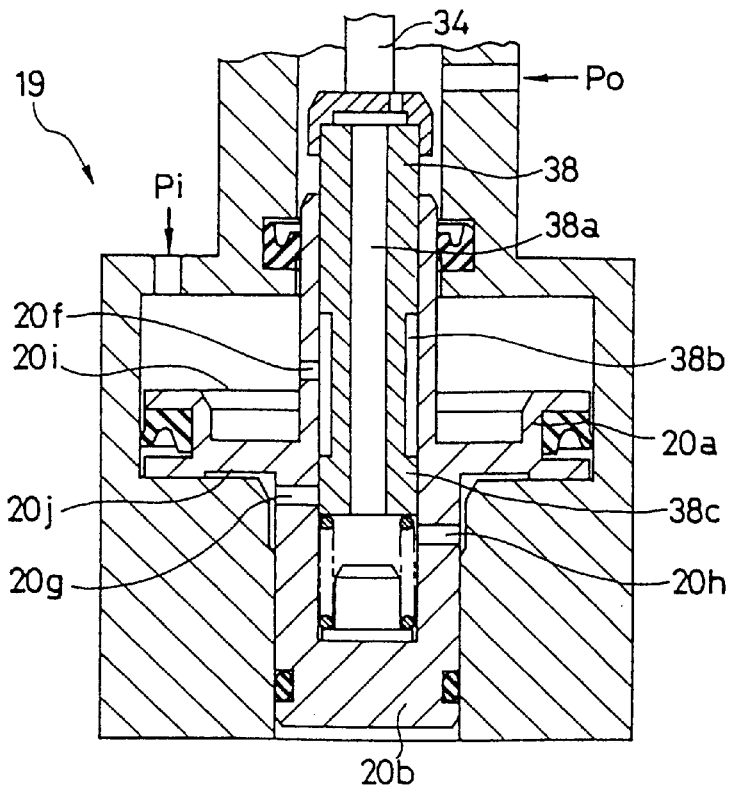
FIG. 10 is a view partly showing the control valve shown in FIG. 9 in an operating state.
Figure 11:
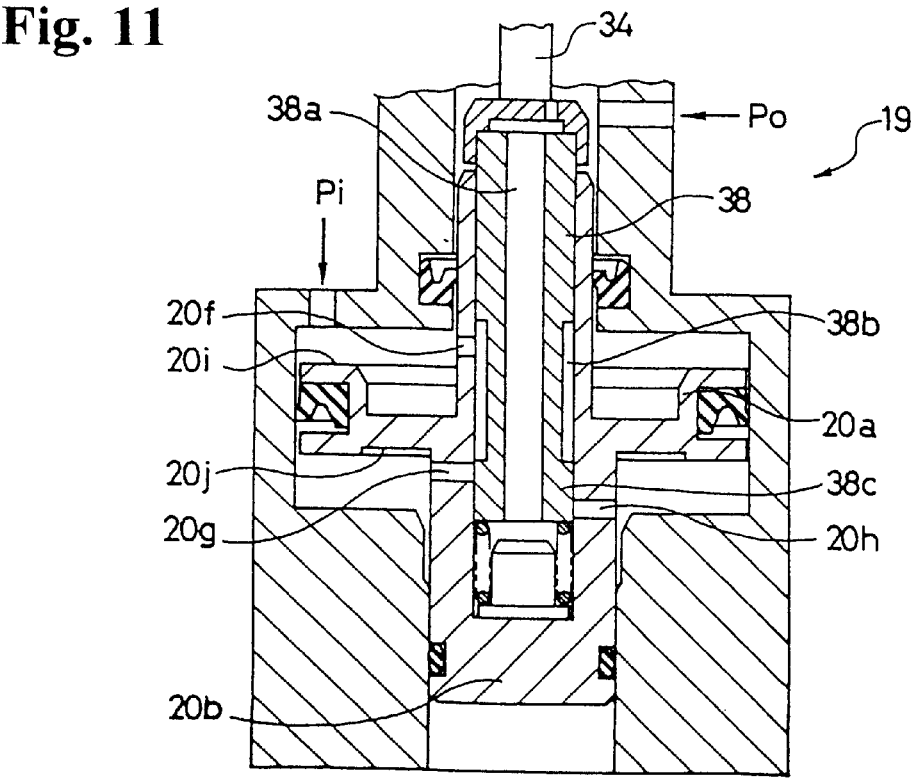
FIG. 11 is a view partly showing the control valve shown in FIG. 9 in another operating state.

When a predetermined pressure difference is developed between the W/C pressure Po and the MCY pressure Pi after starting the pressure intensification by the pressure-intensifying valve 13, the control piston 34 and the spool valve 38 together move upward against the spring force of the spring 36 and stop in a position where the force exerted on the control piston 34 and the spool valve 38 by the pressure difference and the spring force of the spring 36 are in balance. In this state, the communication between the first radial hole 20*f* and the second radial hole 20*g* is interrupted by the valve portion 38*c*, and the third radial hole 20*h* communicates with the through hole 38*a* as shown in FIG. 10 so that the W/C pressure Po acts on the receiving surface 20*j* of the large-diameter portion 20*a*. Therefore, the stepped piston 20 moves upward by the pressure difference between the W/C pressure Po and the MCY pressure Pi. As shown in FIG. 11, when the valve portion 38c reaches such a position that the valve portion 38c interrupts the communication between the second radial hole 20g and the groove 38b, the through hole 38a and interrupts the communication between the third radial hole 20h and the through hole 38a, the stepped piston 20 stops in the position at this point because the W/C pressure Po is no longer introduced toward the receiving surface 20j.

Figure 9:
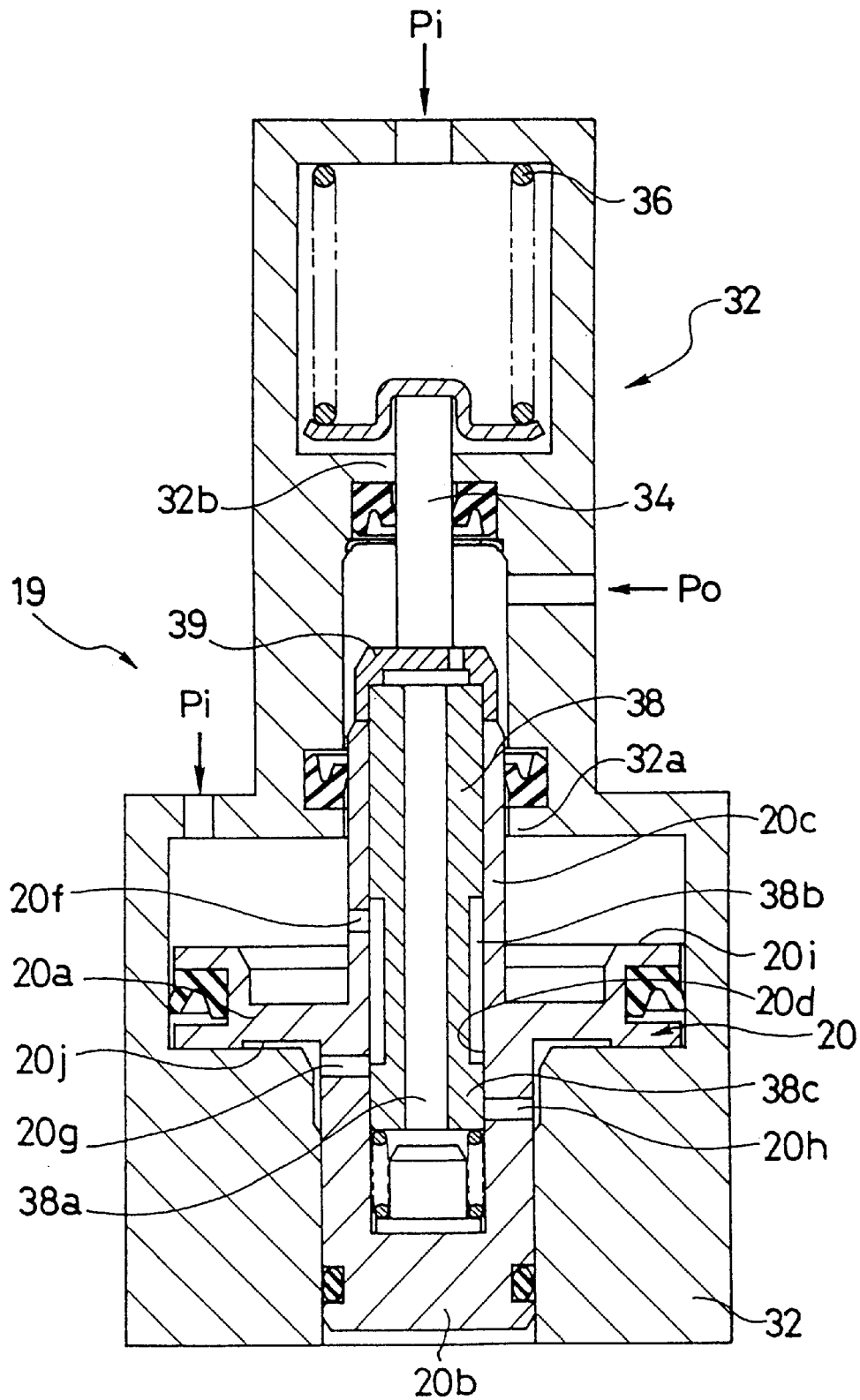
FIG. 9 is an enlarged sectional view of a control valve used in the embodiments shown in FIGS. 8, 13, and 16.

After stopping the pressure intensification, no pressure difference is produced between the MCY pressure Pi and the W/C pressure Po so that the control piston 34 and the spool valve 38 moves downward by the spring force of the spring 36. Therefore, the valve portion 38c allows the communication between the second radial hole 20g and the groove 38b and the pressures exerted on the receiving surfaces 20i and 20j become equal to the MCY pressure Pi. Accordingly, the stepped piston 20, the control piston 34, and the spool valve 38 are in non-operating position as shown in FIG. 9.

In this manner, like the embodiment shown in FIG. 6, the stepped piston 20 is controlled in the stroke defined by the control piston 34 corresponding to the pressure difference between the W/C pressure Po and the MCY pressure Pi.

According to the brake booster system of this embodiment, no spring 21 for biasing the stepped piston 20 is required, thereby enabling the pedal stroke shortening cylinder 19 to be formed in still smaller size.

The other operation and effects of this embodiment are the same as the embodiment shown in FIG. 6.

Figure 12:
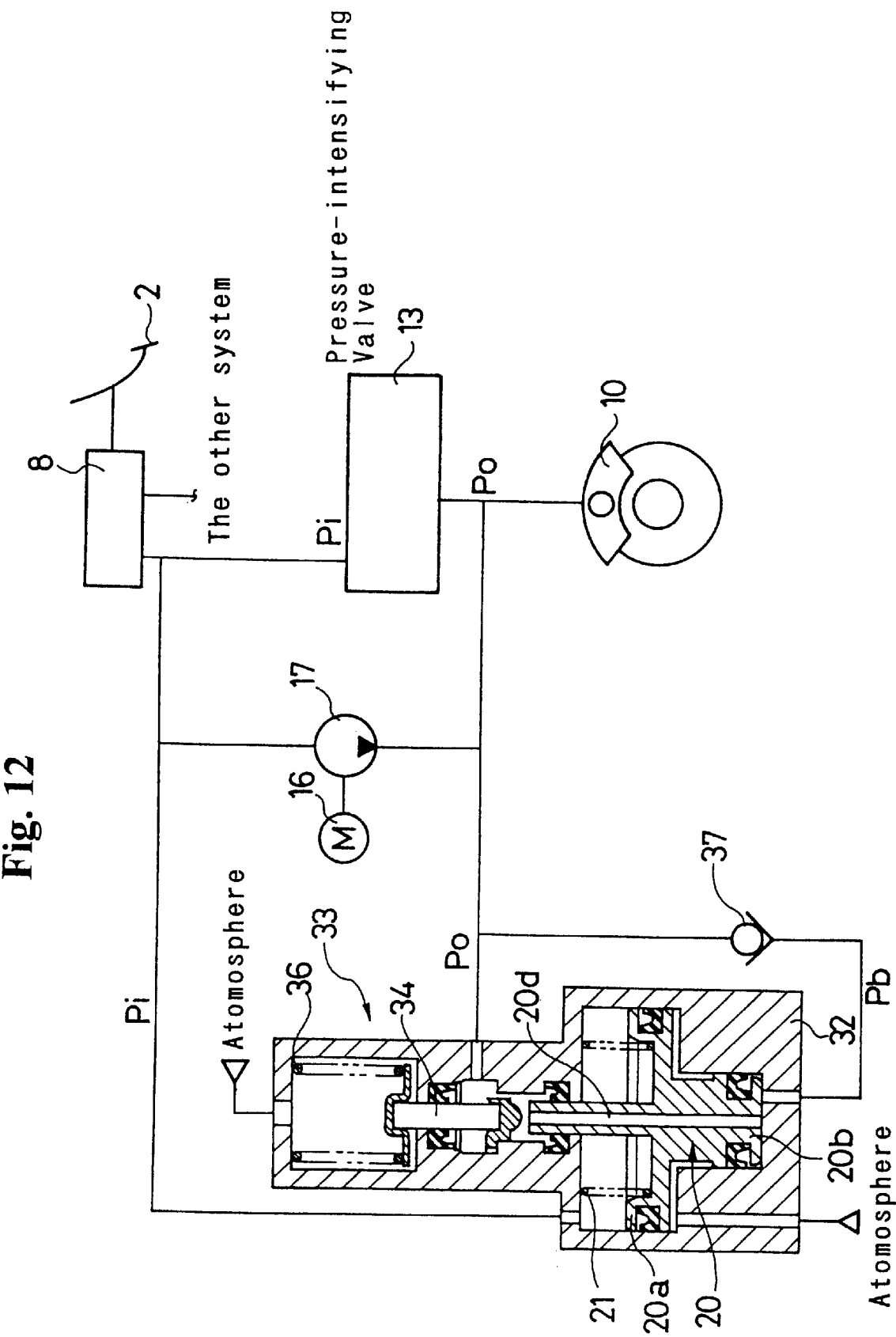
FIG. 12 is a view schematically showing still another one of the embodiments according to the present invention.

FIG. 12 is a view similar to FIG. 6, showing still another embodiment of the present invention. Parts similar or corresponding to the parts of the aforementioned brake booster system shown in FIG. 6 will be marked by the same reference numerals so that the detail description about the parts will be omitted.

In the embodiment shown in FIG. 6, the MCY pressure Pi acts on the end, on which the spring force of the spring 36 is exerted, of the control piston 34. The end, on which the spring force of the spring 36 is exerted, of the control piston 34 is however exposed to the atmosphere in the brake booster system of this embodiment as shown in FIG. 12. In this embodiment, therefore, the MCY pressure Pi does not act on the control piston 34 at all, while the W/C pressure Po acts on the control piston 34 in such a manner as to oppose the spring force of the spring 36.

The other components of the brake booster system of this embodiment are the same as the brake booster system shown in FIG. 6.

In the brake booster system of this embodiment as structured above, the control piston 34 is in a position where the W/C pressure Po and the spring force of the spring 36 are in balance. That is, the position of the control piston 34 is determined by the relation between the W/C pressure Po and the spring force of the spring 36 with the result that the position of the control piston 34 can be properly determined, thereby stabilizing the characteristics of reduction in the pedal stroke. The other operation and effects of this embodiment are the same as the embodiment shown in FIG. 6.

Figure 13:
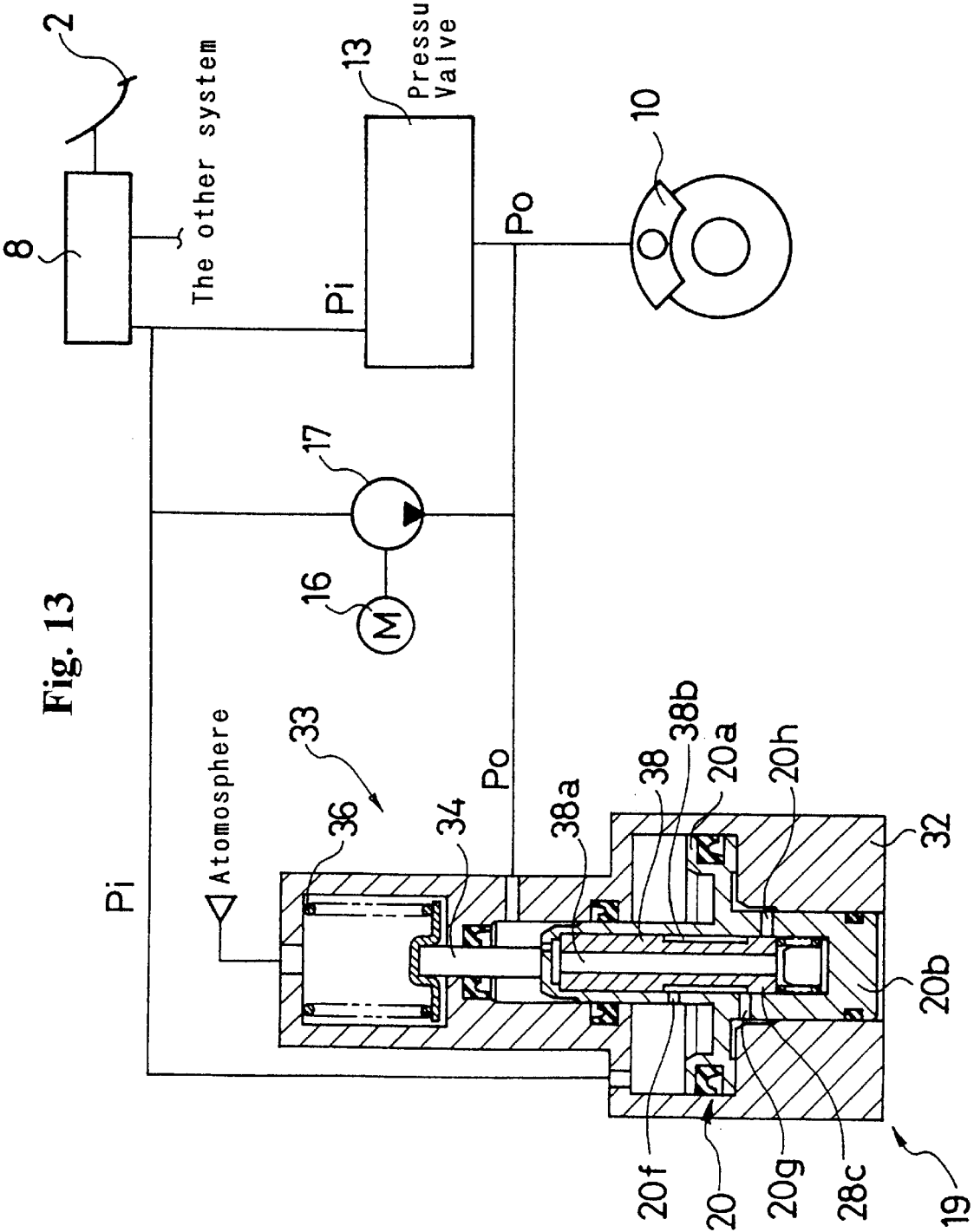
FIG. 13 is a view schematically showing still another one of the embodiments according to the present invention.

FIG. 13 is a view similar to FIG. 8, showing still another embodiment of the present invention. Parts similar or corresponding to the parts of the aforementioned brake booster system shown in FIG. 8 will be marked by the same reference numerals so that the detail description about the parts will be omitted.

In the brake booster system of the aforementioned embodiment shown in FIG. 8, the MCY pressure Pi acts on the end, on which the spring force of the spring 36 is exerted, of the control piston 34. The end, on which the spring force of the spring 36 is exerted, of the control piston 34 is however exposed to the atmosphere in the brake booster system of this embodiment as shown in FIG. 13. In this embodiment, therefore, the MCY pressure Pi does not act on the control piston 34 at all, while the W/C pressure Po acts on the control piston 34 in such a manner as to oppose the spring force of the spring 36.

The other components of the brake booster system of this embodiment are the same as the brake booster system shown in FIG. 8.

In the brake booster system of this embodiment as structured above, the control piston 34 is in a position where the W/C pressure Po and the spring force of the spring 36 are in balance. That is, the position of the control piston 34 is determined by the relation between the W/C pressure Po and the spring force of the spring 36 with the result that the position of the control piston 34 can be properly determined, thereby stabilizing the characteristics of reduction in the pedal stroke.

The other operation and effects of this embodiment are the same as the embodiment shown in FIG. 8.

Figure 14:
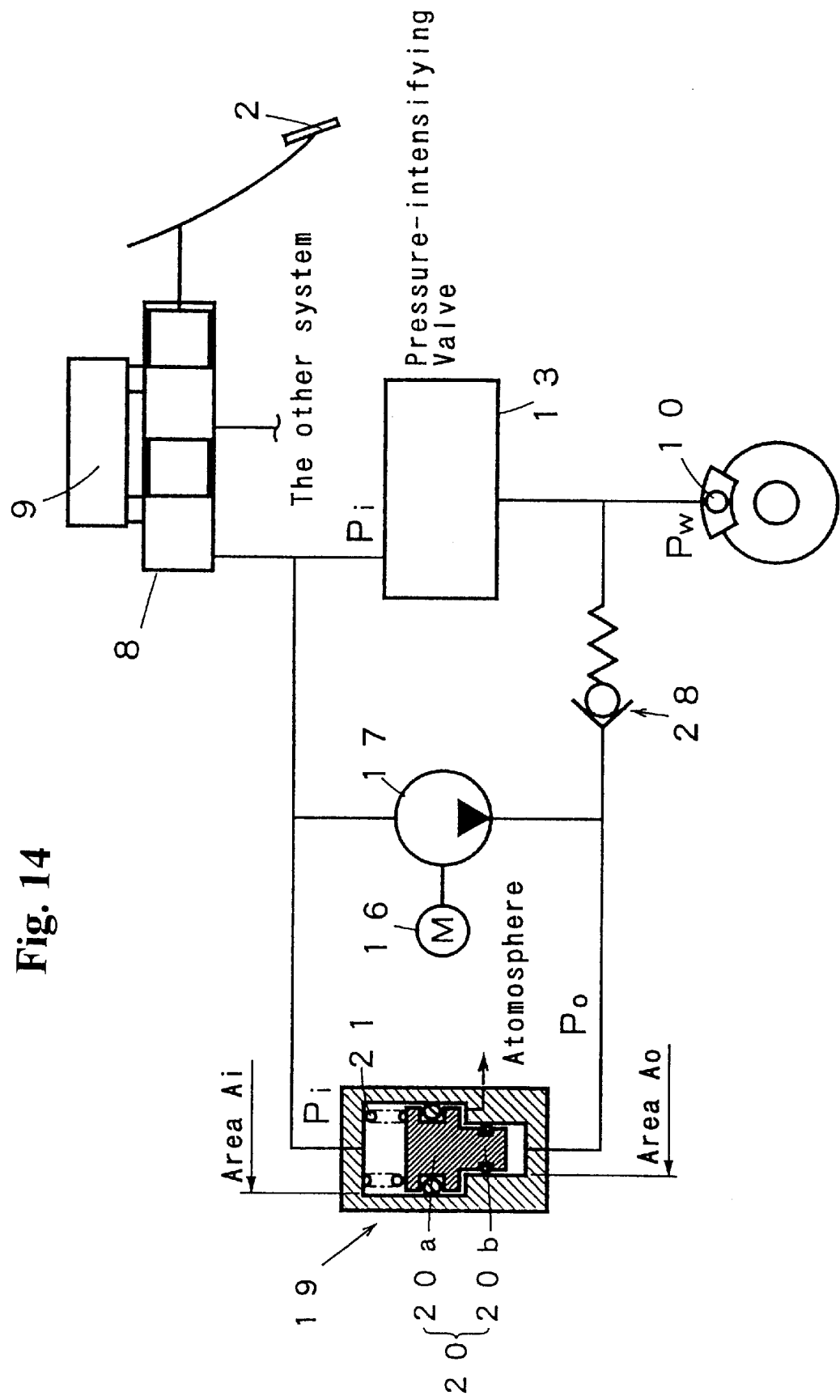
FIG. 14 is a view schematically showing still another one of the embodiments according to the present invention.

FIG. 14 is a view similar to FIG. 4, showing still another embodiment of the present invention. Parts similar or corresponding to the parts of the aforementioned brake booster system shown in FIG. 4 will be marked by the same reference numerals so that the detail description about the parts will be omitted.

Figure 15:
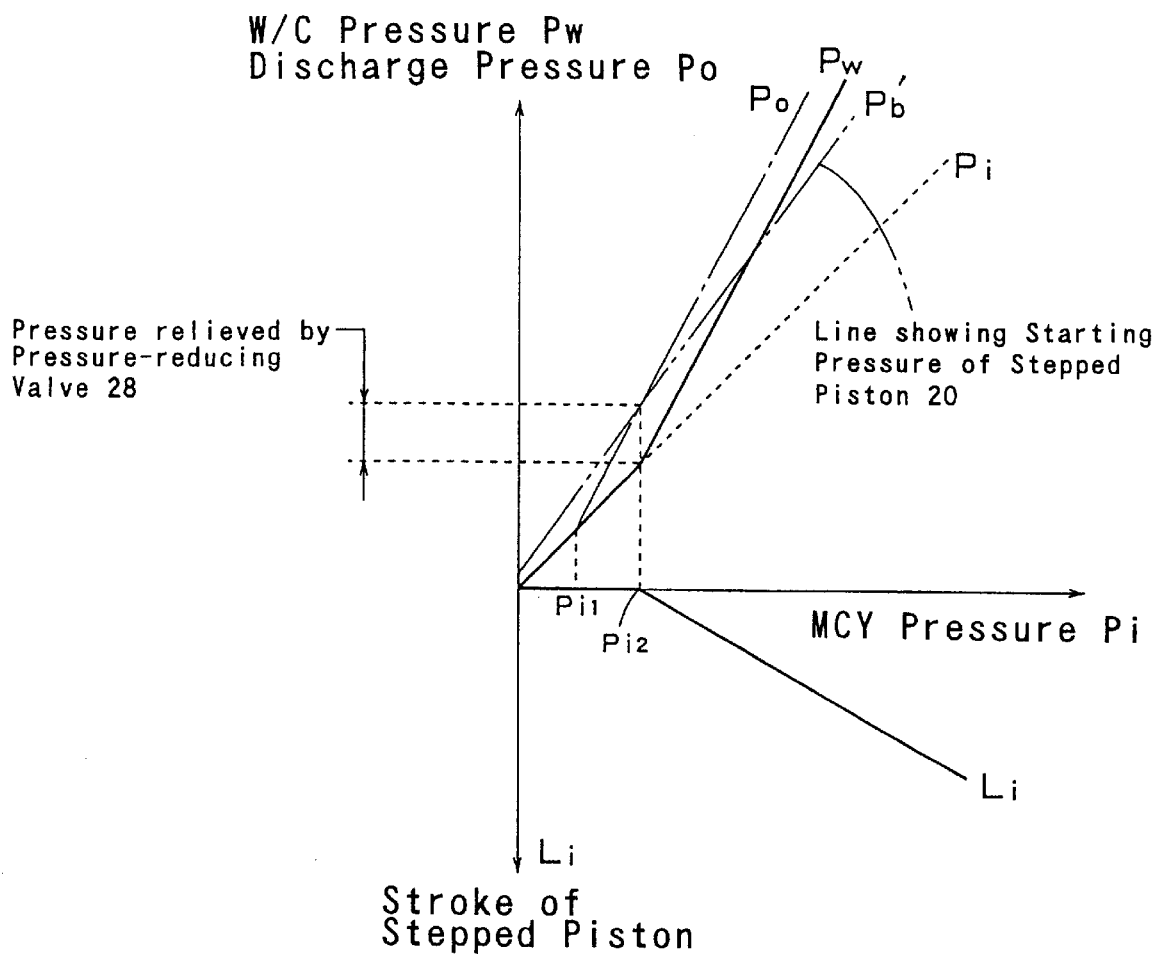
FIG. 15 is a diagram for explaining the relation among MCY pressure Pi, W/C pressure Pw, pump discharge pressure Po, and stroke Li of a stepped piston in the embodiment shown in FIG. 14.

In the embodiment shown in FIG. 4, the P valve is used as the pressure-reducing valve 28 which is disposed on the way of the line connecting the discharge side of the pressure-intensifying pump 17 and the small-diameter portion 20b side of the pedal stroke shortening cylinder 19. However, a conventional relief valve which is well known is used as the pressure-reducing valve 28 which is disposed on the way of the line connecting the discharge side of the pressure-intensifying pump 17 and the W/C 10 (the discharge side of the pressure-intensifying valve 13) in a brake booster system of this embodiment as shown in FIG. 14. The discharge pressure Po of the pressure-intensifying pump 17 is greater than the W/C pressure Pw during the pressure intensification such that the pressure difference therebetween is equal to the pressure relieved by the pressure-reducing valve 28 as shown in FIG. 15.

In the aforementioned embodiments, since the discharge pressure Po of the pressure-intensifying pump 17 is equal to the W/C pressure Pw, the W/C pressure is designated by Po. In this embodiment, however, since the discharge pressure Po is different from the W/C pressure Pw due to the pressure-reducing valve 28, the W/C pressure is designated by Pw to make clear the difference from Po.

The other components of the brake booster system of this embodiment are the same as the brake booster system shown in FIG. 4.

In the brake booster system of this embodiment as structured above, since the discharge pressure Po of the pressure-intensifying pump 17 becomes greater than the W/C pressure Pw during the pressure intensification, the stepped piston 20 is actuated at MCY pressure Pi lower than the cases in the aforementioned embodiments after starting the pressure intensification.

The relief valve can be used as the pressure-reducing valve 28, thereby avoiding the necessity for using an exclusive valve as the pressure-reducing valve 28 and thus can reduce the cost.

The other operation and effects of this embodiment are the same as the embodiment shown in FIG. 4.

Figure 16:
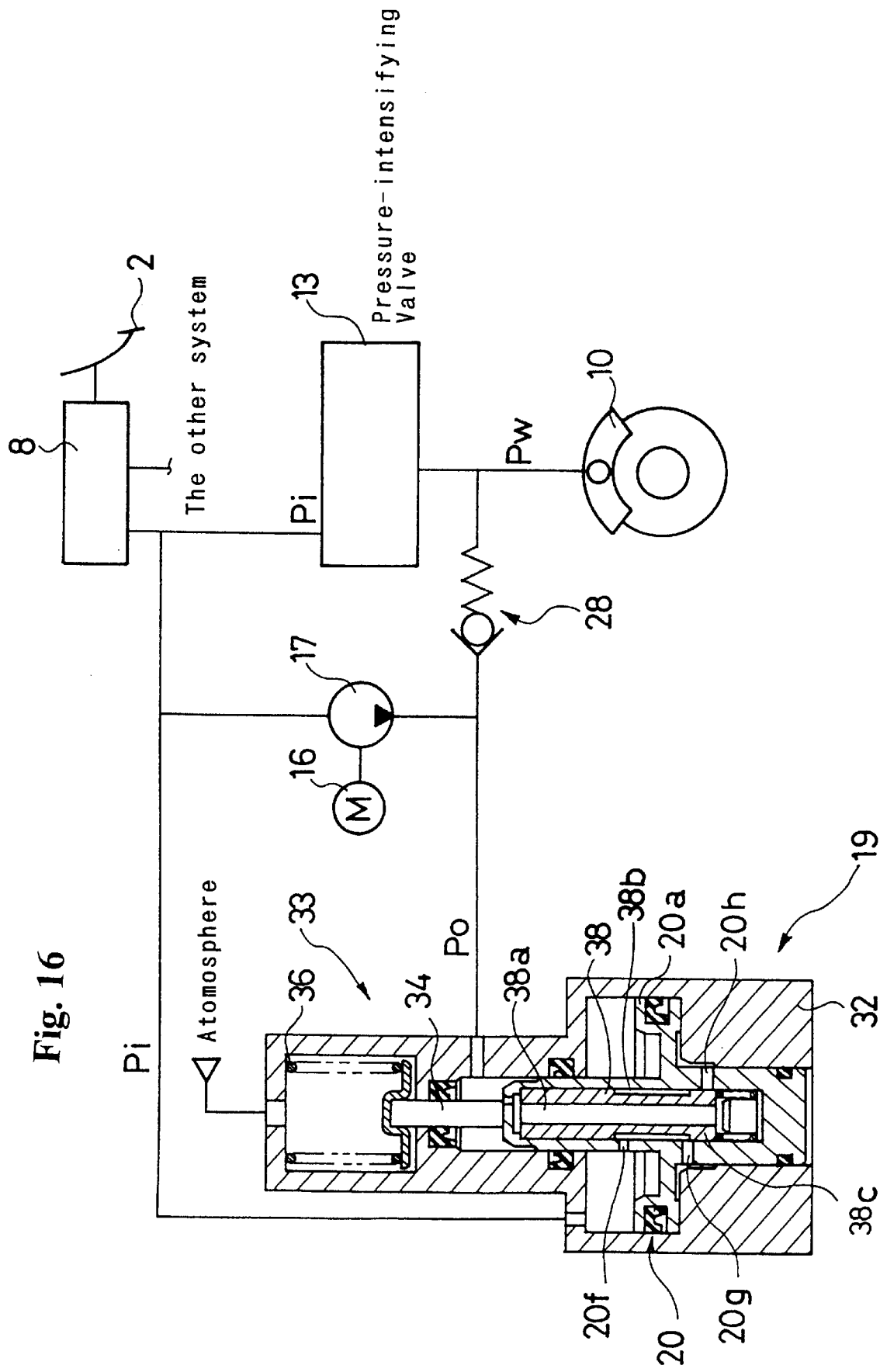
FIG. 16 is a view schematically showing still another one of the embodiments according to the present invention.
Figure 17:
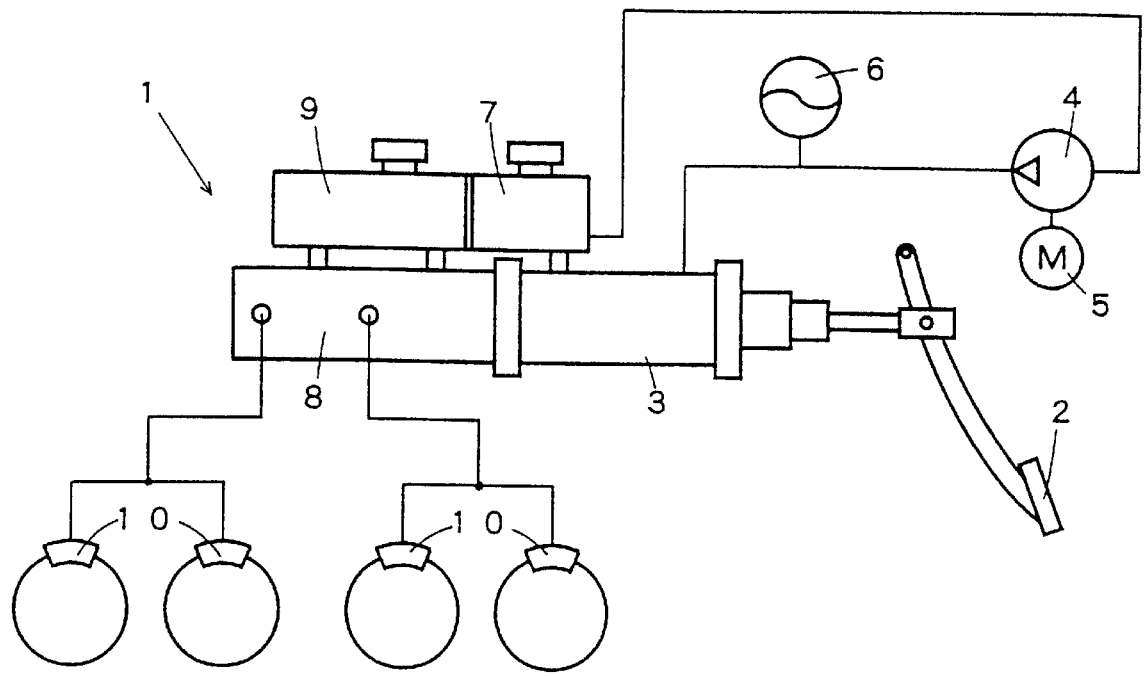
FIG. 17 is a view showing a typical conventional hydraulic brake booster system.
Figure 18:
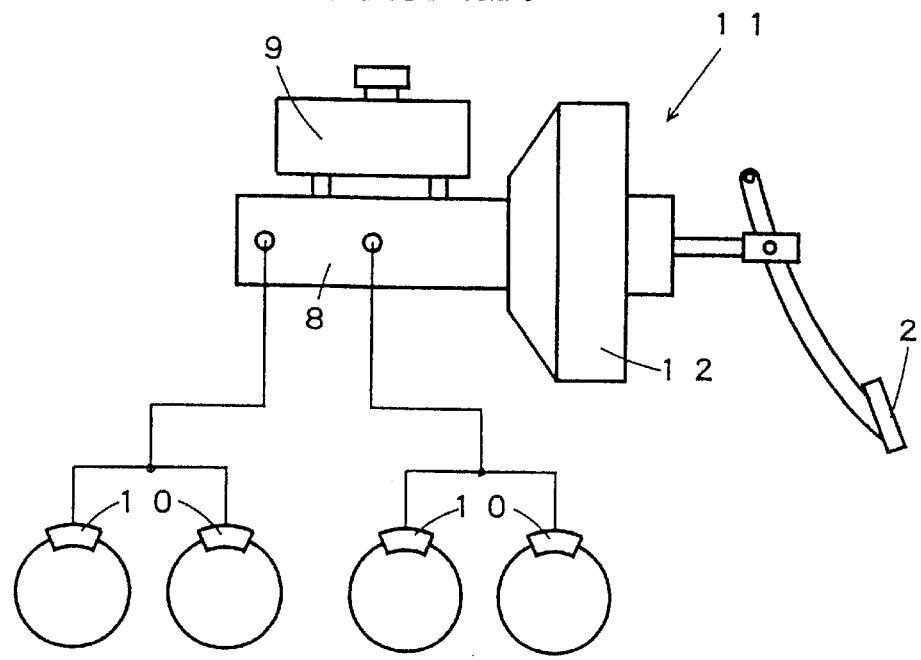
FIG. 18 is a view showing a typical conventional vacuum brake booster system.

FIG. 16 is a view similar to FIG. 13, showing still another embodiment of the present invention. Parts similar or corresponding to the parts of the aforementioned brake booster system shown in FIG. 13 will be marked by the same reference numerals so that the detail description about the parts will be omitted.

As shown in FIG. 16, a brake booster system of this embodiment is a combination of the brake booster system of the embodiment shown in FIG. 13 and the pressure-reducing valve 28 of a relief valve between the discharge side of the pressure-intensifying pump 17 and the W/C 10 of the embodiment shown in FIG. 14.

The other components of the brake booster system of this embodiment are the same as the brake booster system shown in FIG. 13.

In the brake booster system of this embodiment as structured above, the discharge pressure Po of the pressure-intensifying pump 17 is increased just corresponding to the pressure relieved by the pressure-reducing valve 28 so that the increased discharge pressure Po acts on the control piston 34 and the receiving surface 20j of the stepped piston 20. Therefore, the stepped piston 20 starts to operate at the MCY pressure Pi further lower than the embodiment shown in FIG. 13.

The other operation and effects of this embodiment are the same as the embodiment shown in FIG. 13.

As apparent from the above description, the brake booster system of the present invention is able to intensify the brake fluid pressure without using any booster device and still allow the input stroke of a brake operating member to be reduced.

According to the present invention, in the normal braking range where normal intensification is needed, the brake booster system is further able to intensify the brake fluid pressure to a desired pressure for the normal braking only by the boosting action of the booster system. On the other hand, in the range exceeding the normal braking range where intensification greater than the normal intensification is needed, the brake booster system is able to intensify the brake fluid pressure largely by the intensification of the pressure-intensifying valve and the pressure-intensifying pump in addition to the boosting action of the booster device. In this manner, the brake fluid pressure can be intensified largely, thereby allowing the input stroke of the brake operating member to be reduced.

According to the present invention, furthermore, one pump can be used for two purposes as the pressure-intensifying pump and the ABS control pump, thereby simplifying the structure of the brake booster system and making the brake booster system at low cost.

According to the present invention, moreover, the pressure-reducing means can restrict the increase of the differential pressure acting on the stepped piston, thereby avoiding the necessity for the biasing means having strong biasing force. This enables the biasing means to be formed in smaller size and thus enables the stroke shortening means to be also formed in smaller size.

Additionally, according to the present invention, a P valve conventionally used can be used as the pressure-reducing means, thereby avoiding the necessity for using exclusive parts for the pressure-reducing means and reducing the cost.

Further, according to the present invention, the stroke of the stepped piston is defined by the stroke control means so that the stroke of the stepped piston can be restricted smaller and the biasing means for biasing the stepped piston can be formed in smaller size, thereby allowing the stroke shortening means to be formed in smaller size. The smaller biasing force of the biasing means of the stepped piston allows the pedal stroke to be reduced just after starting the pressure intensification.

Furthermore, according to the present invention, the stroke control means comprises the control piston so that the structure of the stroke control means can be simplified and the position of the control piston can be controlled further properly, thereby stabilizing the characteristics of reduction in the pedal stroke.

Additionally, according to the present invention, the master cylinder pressure can act on the other end of the control piston against the discharge pressure, thereby making the second biasing means biasing the control piston to be formed in a smaller size and thus making the stroke shortening means to be also formed in a smaller size.

Moreover, according to the present invention, the discharge pressure of the pressure-intensifying pump is set to be greater than the output pressure of the pressure-intensifying valve, thereby enabling the stroke shortening means to be actuated while the master cylinder pressure is still relatively small.

In addition, according to the present invention, the relief valve conventionally used is used as the pressure-reducing means, thereby avoiding the necessity for using exclusive parts for the pressure-reducing means and reducing the cost.

What we claim is:

1. A brake booster system comprising:

a brake operating member;

a master cylinder for producing master cylinder pressure during said brake operating member is operated;

at least one brake cylinder for producing braking force when the master cylinder pressure is introduced into said brake cylinder;

a pressure-intensifying valve for controlling fluid pressure to render the fluid pressure of said brake cylinder greater than said master cylinder pressure, said pressure-intensifying valve disposed on a brake fluid line between said master cylinder and said brake cylinder;

a pressure-intensifying pump which is actuated during said brake operating member is operated to discharge brake fluid within a line between said pressure-intensifying valve and the said master cylinder to a line between the said pressure-intensifying valve and the brake cylinder, said pressure-intensifying pump disposed on a line arranged in parallel with the line on which said pressure-intensifying valve is disposed; and a stroke shortening means which is actuated by the fluid pressure between said pressure-intensifying valve and said brake cylinder to return the brake fluid to said master cylinder, thereby restricting the input stroke of said brake operating member, said stroke shortening means disposed on a line arranged in parallel with the lines on which said pressure-intensifying valve and said pressure-intensifying pump are disposed respectively.

2. A brake booster system comprising:

a brake operating member;

a master cylinder for producing master cylinder pressure during said brake operating member is operated;

at least one brake cylinder for producing braking force when the master cylinder pressure is introduced into said brake cylinder;

a pressure-intensifying valve for transferring said master cylinder pressure toward said brake cylinder without controlling fluid pressure until said master cylinder pressure reaches predetermined pressure, and for controlling the fluid pressure to render the fluid pressure of said brake cylinder greater than said master cylinder pressure when said master cylinder pressure exceeds said predetermined pressure, said pressure-intensifying valve disposed on a brake fluid line between said master cylinder and said brake cylinder;

a pressure-intensifying pump which is actuated when said master cylinder pressure exceeds said predetermined pressure or when an operating value of said brake operating member exceeds a predetermined value, to discharge brake fluid within a line between said pressure-intensifying valve and the said master cylinder to a line between said pressure-intensifying valve and the said brake cylinder, said pressure-intensifying pump disposed on a line arranged in parallel with the line on which said pressure-intensifying valve is disposed; and a stroke shortening means which is actuated by the discharge pressure of said pressure-intensifying pump to return the brake fluid to said master cylinder, thereby restricting the input stroke of said brake operating member, said stroke shortening means disposed on a line arranged in parallel with the lines on which said pressure-intensifying valve and said pressure-intensifying pump are disposed respectively.

3. A brake booster system as claimed in claim 2, further comprising a brake booster for intensifying and outputting brake operating force of said brake operating member, wherein said master cylinder is actuated by the output of said brake booster to produce said master cylinder pressure, said pressure-intensifying valve transfers said master cylinder pressure toward said brake cylinder without controlling the fluid pressure until said master cylinder pressure reaches the predetermined pressure which is set in a range exceeding a normal braking range and controls the fluid pressure to render the fluid pressure of said brake cylinder greater than said master cylinder pressure when said master cylinder pressure exceeds said predetermined pressure, and said pressure-intensifying pump is actuated when said master cylinder pressure exceeds said predetermined pressure or when said operating value of said brake operating member exceeds the range exceeding said normal braking range to discharge the brake fluid within the line between said pressure-intensifying valve and said master cylinder to the line between the pressure-intensifying valve and said brake cylinder.

4. A brake booster system as claimed in claim 3, further comprising a normally open anti-skid control holding valve which is disposed on a brake fluid line between said pressure-intensifying valve and said brake cylinder and capable of cutting off the brake fluid line, a low pressure accumulator to which brake fluid of said brake cylinder is discharged during decompression by anti-skid control, a normally closed anti-skid control pressure-reducing valve which is disposed on a brake fluid line between said brake cylinder and said low pressure accumulator and capable of opening the brake fluid line, and an anti-skid control pump for supplying brake fluid of said low pressure accumulator to the brake fluid line between said pressure-intensifying valve and said anti-skid control holding valve, wherein one common pump is used to function as both said pressure-intensifying pump and said anti-skid control pump, the suction side of said common pump is connected to said low pressure accumulator during normal operation and anti-skid controlling and is optionally switched to be connected to said master cylinder when said master cylinder pressure exceeds said predetermined pressure or when the operation value of said brake operating member exceeds said predetermined value and anti-skid control is not given.

5. A brake booster system as claimed in claim 2, wherein said stroke shortening means comprises a stepped piston and a biasing means for always biasing said stepped piston in a direction opposite to the direction that said brake fluid is returned to said master cylinder, said stepped piston having a large-diameter portion with a receiving surface connected to said master cylinder for receiving said master cylinder pressure, having a discharge pressure receiving surface for receiving discharge pressure of said pressure-intensifying pump, and moving by pressure difference between said discharge pressure and said master cylinder pressure to return brake fluid in a space facing the receiving surface for receiving said master cylinder pressure, said brake booster system further comprising a pressure reducing means disposed on a line connecting the discharge side of said pressure-intensifying pump and the discharge pressure receiving surface of said stepped piston, wherein said pressure reducing means is actuated to reduce said discharge pressure when said discharge pressure reaches a second predetermined pressure after starting the pressure intensification by said pressure intensifying valve so that the reduced discharge pressure acts on the discharge pressure receiving surface of said stepped piston.

6. A brake booster system as claimed in claim 5, wherein said pressure reducing means is a proportioning valve.

7. A brake booster system as claimed in claim 2, wherein said stroke shortening means comprises a stepped piston and a biasing means for always biasing said stepped piston in such a direction as to increase a volume between said master cylinder and said pressure-intensifying valve, said stepped piston having a large-diameter portion with a receiving surface connected to said master cylinder for receiving said master cylinder pressure, having a discharge pressure receiving surface for receiving discharge pressure of said pressure-intensifying pump, and moving by pressure difference between said discharge pressure and said master cylinder pressure to reduce said volume, said brake booster system further comprising a stroke control means for determining the stroke of said stepped piston so that said stepped piston moves within the stroke determined by said stroke control means.

8. A brake booster system as claimed in claim 7, wherein said stroke control means comprises a control piston having an end on which said discharge pressure acts and the other end on which the biasing force of a second biasing means is always exerted.

9. A brake booster system as claimed in claim 8, wherein said master cylinder pressure also acts on the other end of said control piston.

10. A brake booster system as claimed in claim 2, wherein said stroke shortening means comprises a stepped piston and a biasing means for always biasing said stepped piston in such a direction of increasing a volume between said master cylinder and said pressure-intensifying valve, said stepped piston having a large-diameter portion with a receiving surface connected to said master cylinder for receiving said master cylinder pressure, having a discharge pressure receiving surface for receiving discharge pressure of said pressure-intensifying pump, and moving by pressure difference between said discharge pressure and said master cylinder pressure to reduce said volume, said brake booster system further comprising a pressure reducing means disposed on a line connecting the discharge side of said pressure-intensifying pump and the outlet side of said pressure-intensifying valve, wherein said pressure reducing means is actuated when said discharge pressure reaches a second predetermined pressure to reduce said discharge pressure and introduce it to the outlet side of said pressure-intensifying valve.

11. A brake booster system as claimed in claim 10, wherein said pressure reducing means is a relief valve which is actuated when said discharge pressure reaches a predetermined relief pressure.

* * * * *